United States Patent
Maeda et al.

(10) Patent No.: US 9,557,345 B2
(45) Date of Patent: Jan. 31, 2017

(54) INERTIAL SENSOR

(71) Applicant: Hitachi Automotive Systems, Ltd., Hitachinaka-shi, Ibaraki (JP)

(72) Inventors: Daisuke Maeda, Kokubunji (JP); Heewon Jeong, Tokyo (JP); Masahide Hayashi, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 240 days.

(21) Appl. No.: 13/921,505

(22) Filed: Jun. 19, 2013

(65) Prior Publication Data
US 2013/0340524 A1 Dec. 26, 2013

(30) Foreign Application Priority Data
Jun. 26, 2012 (JP) ................. 2012-142958

(51) Int. Cl.
| | |
|---|---|
| *G01P 15/125* | (2006.01) |
| *G01P 3/483* | (2006.01) |
| *G01P 15/08* | (2006.01) |
| *G01C 19/5776* | (2012.01) |

(52) U.S. Cl.
CPC ....... *G01P 15/0888* (2013.01); *G01C 19/5776* (2013.01); *G01P 15/125* (2013.01); *G01P 2015/0814* (2013.01)

(58) Field of Classification Search
CPC .............................. G01P 3/483; G01P 15/0888
See application file for complete search history.

(56) References Cited

U.S. PATENT DOCUMENTS

| | | | | |
|---|---|---|---|---|
| 4,750,364 A | * | 6/1988 | Kawamura | ........ G01C 19/5607 73/504.04 |
| 6,571,630 B1 | * | 6/2003 | Weinberg | ............. B23K 26/032 219/121.69 |
| 2002/0020810 A1 | * | 2/2002 | Wine | ................. G02B 26/0833 250/234 |
| 2005/0072233 A1 | | 4/2005 | Nozoe | |

(Continued)

FOREIGN PATENT DOCUMENTS

| | | |
|---|---|---|
| JP | 2005-114394 A | 4/2005 |
| JP | 2011-095104 A | 5/2011 |

*Primary Examiner* — Robert Huber
*Assistant Examiner* — Herbert K Roberts
(74) *Attorney, Agent, or Firm* — Foley & Lardner LLP

(57) ABSTRACT

In an inertial sensor, an acceleration sensor element section includes a first movable section configured to respond to acceleration applied thereto and a diagnosis electrode configured to displace the first movable section with an electrostatic force according to voltage application from a control circuit section. An angular velocity sensor element section includes a second movable section configured to respond to an angular velocity applied thereto and a driving electrode configured to displace the second movable section with an electrostatic force according to voltage application from the control circuit section. A voltage signal input to the driving electrode and a voltage signal input to the diagnosis electrode are the same voltage signal. The voltage signal input to the diagnosis electrode is a signal for detecting a mechanical failure. Carrier signal for detecting displacement of the first movable section has frequency higher than frequency of signal applied to the diagnosis electrode.

12 Claims, 10 Drawing Sheets

(56) References Cited

U.S. PATENT DOCUMENTS

| | | | | |
|---|---|---|---|---|
| 2007/0061107 | A1* | 3/2007 | Vock | A42B 3/046 |
| | | | | 702/182 |
| 2008/0202237 | A1* | 8/2008 | Hammerschmidt | G01C 19/5719 |
| | | | | 73/504.04 |
| 2008/0282801 | A1* | 11/2008 | Yin | G01C 19/5642 |
| | | | | 73/514.01 |
| 2010/0116632 | A1* | 5/2010 | Smith | B81B 7/04 |
| | | | | 200/181 |
| 2010/0300203 | A1* | 12/2010 | Gotoh | G01C 19/5719 |
| | | | | 73/504.15 |
| 2011/0100126 | A1* | 5/2011 | Jeong | G01C 19/5719 |
| | | | | 73/514.32 |
| 2011/0238363 | A1* | 9/2011 | Nakamura | G01C 19/56 |
| | | | | 702/141 |
| 2013/0133422 | A1* | 5/2013 | Yamanaka | G01C 19/5747 |
| | | | | 73/504.03 |
| 2013/0285172 | A1* | 10/2013 | Jeong | G01C 19/574 |
| | | | | 257/415 |
| 2013/0312517 | A1* | 11/2013 | Jeong | G01P 15/125 |
| | | | | 73/504.04 |

* cited by examiner

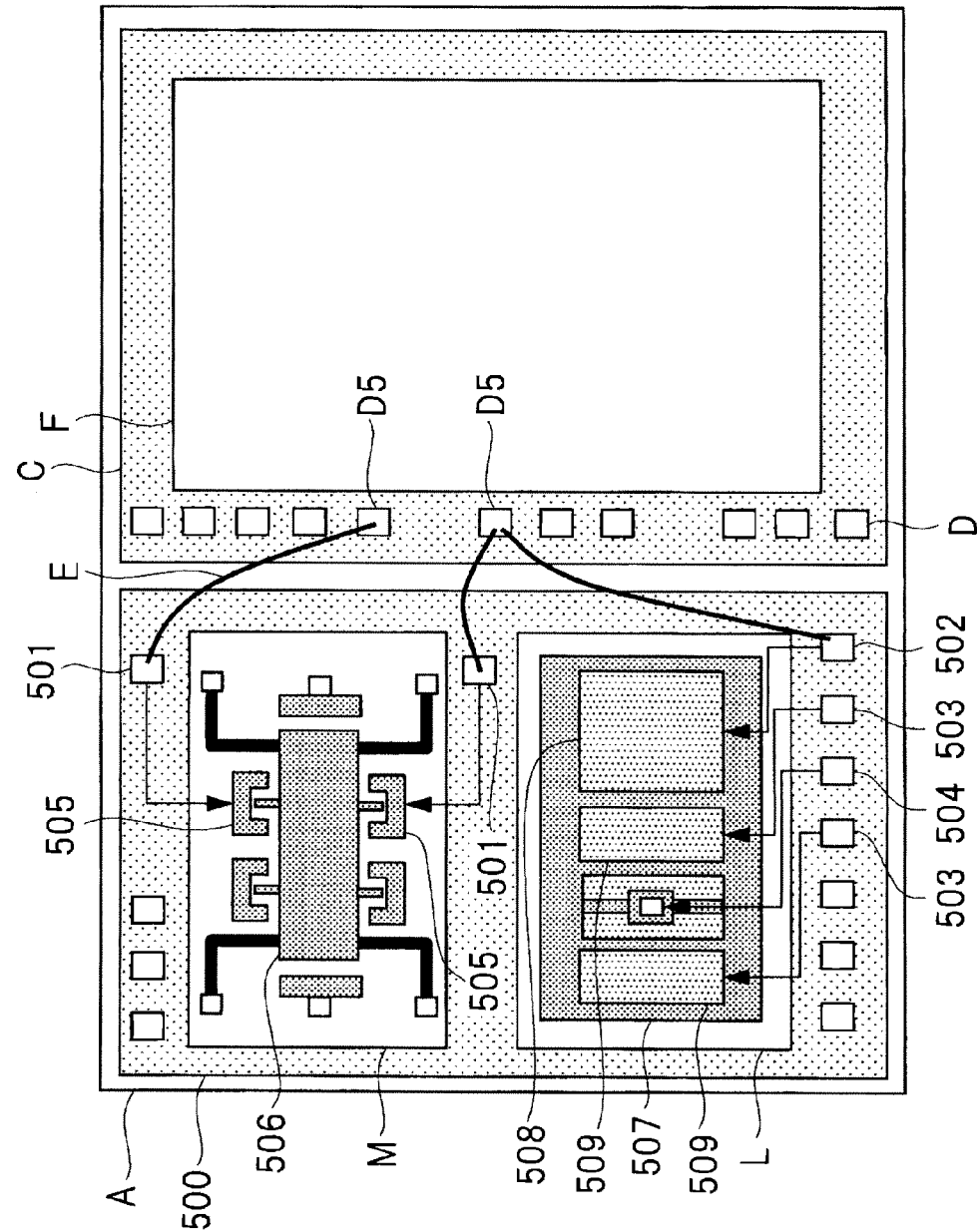

INERTIAL SENSOR

CROSS-REFERENCE TO RELATED PATENT APPLICATIONS

Japan Priority Application 2012-142958, filed Jun. 26, 2012 including the specification, drawings, claims and abstract, is incorporated herein by reference in its entirety.

BACKGROUND OF THE INVENTION

Field of the Invention

The present invention relates to a combined sensor that detects acceleration and an angular velocity and, more particularly, to a technique effectively applied to the configuration of an inertial sensor that includes a function for detecting presence or absence of a failure or an abnormality and provides high reliability.

Background Art

According to the development of the semiconductor micromachining technique and the integrated circuit technique, a sensor of a type called MEMS (Micro Electro Mechanical Systems) that detects inertia has been developed. In particular, application of the sensor device to the automobile field is in progress.

For example, in an angular velocity sensor, because the MEMS sensor has a characteristic that the MEMS sensor can be manufactured more inexpensively and in a smaller size than a Fiber Optic Gyro in which an optical fiber in the past is used, the MEMS sensor is being widely applied to new vehicle control systems such as a electronic stability control system and a rollover detection system for consumer automobiles.

In an acceleration sensor, the MEMS sensor has a characteristic that the MEMS sensor can be manufactured in a small size, for uses such as collision detection and suspension control, there has been developed a new application method for attaching a plurality of modules in various places of a vehicle and realizing fine control.

Further, in recent years, an activity for advancing a cost reduction is in progress according to "combining" for realizing a plurality of physical quantity detections with one sensor module or one detecting element chip. This has enabled application of the vehicle control system mounted only on a luxury car to a popular car.

However, in these sensors for vehicle mounted applications, it is likely that a failure of the sensors leads to a severe accident. Therefore, it is desirable to not only reduce a failure occurrence rate but also provide a "failure detecting function" for, if a sensor failure should occur, immediately notifying a host system of the failure. However, such a failure detecting function is not always necessary for an inertial sensor for so-called electronic devices such as a portable information terminal and a game machine. Therefore, the addition of such a function for detecting a failure causes an increase in manufacturing costs and adjustment costs for the sensors for vehicle mounted applications.

For example, JP-A-2005-114394 (Patent Literature 1) discloses, in an inertial sensor including a detecting element 6, a configuration for applying an alternating-current bias signal voltage to a component preceding a synchronous demodulator 24, specifically, to the detecting element 6 to thereby detect a failure such as breaking of wire or a ground fault that could occur in the detecting element 6 or a detection circuit 27. To solve the problem explained above, in particular, in order to reduce manufacturing costs, Patent Literature 1 discloses, in an inertial sensor that includes an angular velocity sensor including a self-excited oscillation loop circuit, an excitation frequency of a self-excited excitation loop signal voltage of which is equal to or lower than 50 kHz, and detects acceleration and an angular velocity, a configuration for using the self-excited oscillation loop signal voltage of the angular velocity sensor as the alternating-current bias signal voltage of the acceleration sensor. In this technique, a circuit for generating the alternating-current bias signal voltage of the inertial sensor is made unnecessary. Therefore, it is considered that manufacturing costs can be reduced.

JP-A-2011-95104 (Patent Literature 2) discloses, in a capacitance type sensor, a configuration for electrically separating a capacitative element C1 and a capacitive element C2 that detect a capacitance change due to displacement of a detecting element and a capacitive element C3 and a capacitive element C4 that configure a forced vibration generating section. That is, a voltage signal for causing the capacitive element C3 and the capacitive element C4, which generate forced vibration, to generate an electrostatic force is applied to a movable section of the detecting element. With this configuration, the movable section is physically displaced and this displacement is detected through the capacitive element C1 and the capacitive element C2. Consequently, it is possible to detect a mechanical failure of the detecting element such as sticking and breakage of a beam. In the configuration, a voltage signal for causing forced vibration for a diagnosis in the detecting element is not superimposed. The respective signals are given from different elements. Therefore, there is no crosstalk of a diagnosis signal with a detection signal and offset fluctuation does not occur. This is effective in terms of preventing a wrong diagnosis of the sensor.

The inventor examined the related arts of Patent Literature 1 and Patent Literature 2. As a result, problems explained below were clarified.

For example, in the configuration for using the self-excited oscillation loop signal voltage of the angular velocity sensor as the alternating-current bias signal voltage of the inertial sensor as in the technique described in Patent Literature 1, a configuration for making a circuit for generation of the alternating-current bias signal voltage of the inertial sensor unnecessary is realized. However, since the movable section of the detecting element is not actually moved, a sensitivity change or a resonant frequency change due to sticking of the detection element or breakage of a beam cannot be detected. That is, even if the sticking occurs and the inertial sensor falls into a state in which the inertial sensor cannot detect any inertia change, this state cannot be recognized and a misrecognition that "the inertial sensor is in a normal state" occurs.

In the configuration for giving forced vibration and detecting a mechanical failure such as sticking as in the technique described in Patent Literature 2, if a resonant frequency of a target detection element is high, that is, under a condition that the movable section is supported using a hard beam, there are disadvantages. For example, disadvantages occur in that manufacturing costs are sacrificed or costs of the detecting element are sacrificed, for example, in order to generate a strong electrostatic force for moving the detecting element, (1) the driving voltage signal for causing vibration is set to a high voltage and (2) a large area of an electrode is secured to increase the capacitance of the capacitive elements. In particular, such conditions occur in an acceleration sensor having a hard beam, that is, an acceleration sensor having a high range, for example, detection range such as several tens G (1G is gravitational acceleration of 9.8 m/s$^2$) to several hundred G. As an application example of the acceleration sensor, an acceleration sensor for detection of large acceleration such as "collision detection" for detecting timing for actuating an air bag is relevant.

SUMMARY OF THE INVENTION

Therefore, the present invention has been devised in order to solve the problem in that the manufacturing costs increases in realizing a mechanical diagnosis of the acceleration sensor having the hard beam. A representative object of the present invention is to provide, in an inertial sensor that detects acceleration and an angular velocity, a technique for realizing, at low costs, a mechanical failure diagnosis of an acceleration sensor having a hard beam for detecting a high range.

The object and the characteristics explained above and other objects and new characteristics of the present invention will be made apparent from the description of this specification and the accompany drawings.

Among inventions disclosed in this application, overviews of representative inventions are as briefly explained below.

A representative inertial sensor includes an acceleration sensor, an angular velocity sensor, and a control circuit configured to control the acceleration sensor and the angular velocity sensor. The inertial sensor has characteristics explained below. The acceleration sensor includes: a first movable section configured to respond to acceleration applied thereto; and a first electrode configured to displace the first movable section with an electrostatic force according to voltage application from the control circuit. The angular velocity sensor includes: a second movable section configured to respond to an angular velocity applied thereto; and a second electrode configured to displace the second movable section with an electrostatic force according to voltage application from the control circuit. A voltage signal input to the second electrode of the angular velocity sensor and a voltage signal input to the first electrode of the acceleration sensor are the same voltage signal. The voltage signal input to the first electrode of the acceleration sensor is a signal for detecting a mechanical failure. A carrier signal for detecting displacement of the first movable section of the acceleration sensor has a frequency higher than a frequency of a signal applied to the first electrode.

An effect obtained by the representative inventions among the inventions disclosed in this application is as briefly explained below.

The representative effect is that, in the inertial sensor that detects acceleration and an angular velocity, it is possible to realize, at low costs, a mechanical failure diagnosis of the acceleration sensor having a hard beam for detecting a high range.

BRIEF DESCRIPTION OF THE DRAWINGS

FIG. 10 is a diagram showing an example of the configuration of the acceleration sensor element section and the angular velocity sensor element section in FIG. 9 in plan view.

DETAILED DESCRIPTION OF THE INVENTION

Figure 1:
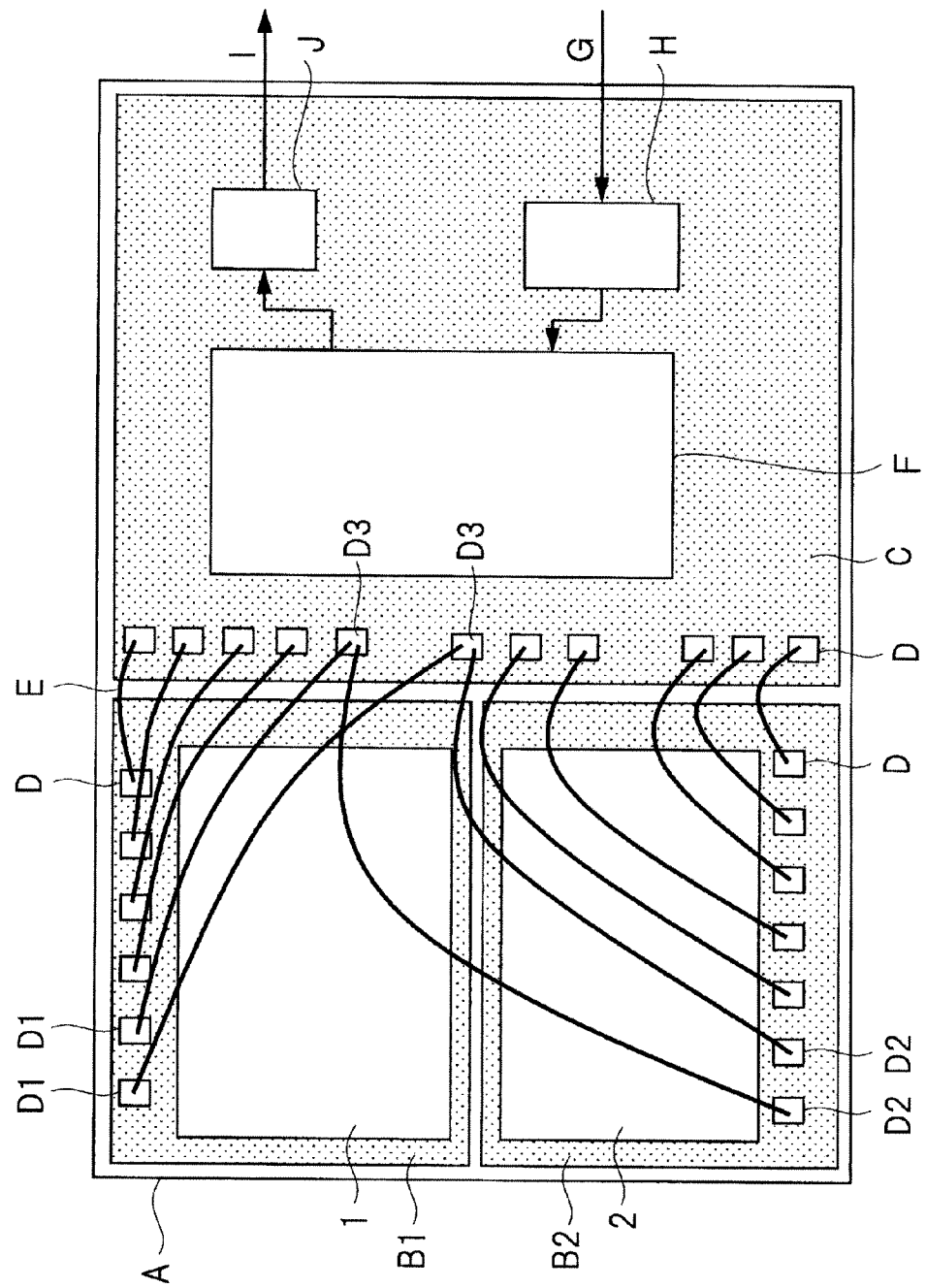
FIG. 1 is a diagram showing an example of the configuration of an inertial sensor in a first embodiment of the present invention.

In embodiments explained below, when necessary for convenience, an embodiment is divided into a plurality of sections or embodiments and explained. However, except when clearly indicated in particular, the sections or the embodiments are not in an unrelated relation one another but are in a relation in which one is a modification, details, supplementary explanation, or the like of a part or all of the other. In the embodiments explained below, when the number and the like (including the number, a numerical value, an amount, and a range) of elements are referred to, except, for example, when clearly indicated in particular and when the number is clearly limited to a specific number in principle, the number is not limited to the specific number and may be equal to or larger than or equal to or smaller than the specific number.

Further, in the embodiments explained below, except, for example, when clearly indicated in particular and when considered obviously essential in principle, it is needless to say that constituent elements (including element steps) of the embodiments are not always essential. Similarly, in the embodiments, when shapes, a positional relation, and the like of the elements and the like are referred to, except, for example, when clearly indicated in particular and when considered obviously unlikely, the shapes and the like include those substantially approximate or similar thereto. This holds true concerning the numerical values and the range.

Overview of Embodiments

First, an overview of embodiments is explained. In the overview of the embodiments, as an example, constituent elements are explained with constituent elements corresponding thereto in the embodiments and reference numerals and signs shown in parentheses.

A representative inertial sensor in an embodiment includes an acceleration sensor (an acceleration sensor element section 1), an angular velocity sensor (an angular velocity sensor element section 2), and a control circuit (a control circuit section F) configured to control the acceleration sensor and the angular velocity sensor. The inertial sensor has characteristics explained below. The acceleration sensor includes: a first movable section (a movable section 11) configured to respond to acceleration applied thereto; and a first electrode (diagnosis electrodes 12) configured to displace the first movable section with an electrostatic force according to voltage application from the control circuit. The angular velocity sensor includes: a second movable section (a movable section 21) configured to respond to an angular velocity applied thereto; and a second electrode (driving electrodes 22) configured to displace the second movable section with an electrostatic force according to voltage application from the control circuit. A voltage signal input to the second electrode of the angular velocity sensor and a voltage signal input to the first electrode of the acceleration sensor are the same voltage signal. The voltage signal input to the first electrode of the acceleration sensor is a signal for detecting a mechanical failure. A carrier signal for detecting displacement of the first movable section of the acceleration sensor has a frequency higher than a frequency of a signal applied to the first electrode.

Embodiments based on the overview of the embodiment explained above are explained in detail below with reference to the drawings. In all the figures for explaining the embodiments, as a general rule, the same members are denoted by the same reference numerals and signs and repeated explanation of the members is omitted.

In the embodiments, as an example, an inertial sensor that realizes uniaxial acceleration detection and uniaxial angular velocity detection is explained. A technique explained in this specification is not always limited to the configuration explained above and may be a configuration including multiple detection axes or including a configuration for detecting physical amounts other than acceleration and an angular velocity.

First Embodiment

An inertial sensor in a first embodiment is explained with reference to FIGS. 1 to 6.

Configuration of the Inertial Sensor

First, the configuration of the inertial sensor in this embodiment is explained with reference to FIG. 1. FIG. 1 is a diagram showing an example of the configuration of the inertial sensor. FIG. 1 is a packaging form for realizing the inertial sensor. In FIG. 1, reference sign A denotes an external package, B1 denotes an acceleration detection chip including an acceleration sensor element section 1, B2 denotes an angular velocity detection chip including an angular velocity sensor element section 2, C denotes a control circuit chip, and D denotes pads (electrodes) on the chips. Among the pads D, in particular, reference sign D1 denotes pads for diagnosis voltage input for receiving a diagnosis voltage for the acceleration detection chip B1, D2 denotes pads for driving voltage input for receiving a driving voltage for the angular velocity detection chip B2, and D3 denotes pads for driving voltage output for outputting a driving voltage of the control circuit chip C. Further, reference sign E denotes bonding wires, F denotes a control circuit section in the control circuit chip C, G denotes external power supply supplied from the outside, H denotes a regulator circuit section included in the control circuit chip C and configured to adjust the external power supply G, I denotes an output signal, and J denotes an output-signal generating section included in the control circuit chip C and configured to generate an output signal.

In this embodiment, an inertial sensor of a combined sensor that realizes uniaxial acceleration detection and uniaxial angular velocity detection is used. The inertial sensor includes the acceleration detection chip B1 housed in the external package A and including the acceleration sensor element section 1, the angular velocity detection chip B2 including the angular velocity sensor element section 2, and the control circuit chip C. The acceleration detection chip B1, the angular velocity detection chip B2, and the control circuit chip C are electrically connected by the bonding wires E that connect the pads D on the chips.

The external package A is a package for housing various components of the inertial sensor. A method of casing the components with a material such as plastic or ceramic may be used or a packaging method for filling a material such as resin called transfer mold package may be used. In any case, there are advantages such as convenience and a manufacturing cost reduction because two kinds of inertia of acceleration and an angular velocity can be obtained by one package.

The acceleration sensor element section 1 is manufactured on the acceleration detection chip B1. The angular velocity sensor element section 2 is manufactured on the angular velocity detection chip B2. However, this packaging method is only an example. For example, as explained below, the acceleration sensor element section 1 and the angular velocity sensor element section 2 may be manufactured on the same chip.

The control circuit chip C is a so-called IC (Integrated Circuit) including a power supply circuit, an oscillator, a C/V (Capacitance to Voltage) conversion circuit, and an ADC (Analogue to Digital conversion) circuit. The control circuit chip C is an IC obtained by integrating a circuit that controls the acceleration sensor element section 1 manufactured on the acceleration detection chip B1 and the angular velocity sensor element section 2 manufactured on the angular velocity detection chip B2 and provides a function for measuring inertia such as acceleration and an angular velocity.

On the control circuit chip C, an output-signal generating section J configured to perform a function for outputting a measurement result of the measurement to the outside as the output signal I is also manufactured. The output-signal generating section J may be set on the outside of the external package A, housed in the external package A, or incorporated in the control circuit section F.

The control circuit chip C may be divided into two or more chips in order to control the acceleration sensor element section 1 and the angular velocity sensor element section 2 independently from each other. However, as explained below, if the chips use a clock and a signal in common, the advantages of the present invention can be markedly obtained. Therefore, the control circuit chip C is desirably integrated as one chip. Any one of the acceleration sensor element section 1 and the angular velocity sensor element section 2 or both may be manufactured on the control circuit chip C. Such a packaging method is called "surface MEMS" or "CMOS-compatible MEMS" and is a technique for configuring a movable body on an integrated circuit chip. Even if this embodiment is realized using such a technique, the embodiment does not deviate from the essence of the present invention.

The pads D present on the acceleration detection chip B1, the angular velocity detection chip B2, and the control circuit chip C are electrode sections configured to connect the bonding wires E for exchanging electric signals among the respective chips. In the example shown in FIG. 1, the pads ID are arranged on one side of the chips (the upper side of the acceleration detection chip B1, the lower side of the angular velocity detection chip B2, and the left side of the control circuit chip C). In particular, the pads for driving voltage output D3 for outputting a driving voltage of the control circuit chip C are connected, in parallel, to the pads for diagnosis voltage input D1 for receiving a diagnosis voltage for the acceleration detection chip B1 and the pads for driving voltage input D2 for receiving a driving voltage for the angular velocity detection chip B2. Pad functions of the pads for diagnosis voltage input D1, the pads for driving voltage input D2, and the pads for driving voltage output D3 are explained below. As connection of the chips, the chips may be directly connected by the bonding wires E as shown in FIG. 1 or may be connected via a wiring circuit in the package.

A power supply for the external package A, i.e., the acceleration sensor element section 1 and the angular velocity sensor element section 2 is an external power supply G supplied to the external package A. The external power supply G supplied from the outside performs conversion to an appropriate voltage and removal of noise in the power supply circuit included in the regulator circuit section H on the control circuit chip C. As a mechanism for adjusting the power supply, an external regulator element or the like may be used.

Configuration of the Acceleration Detection Chip

Figure 2:
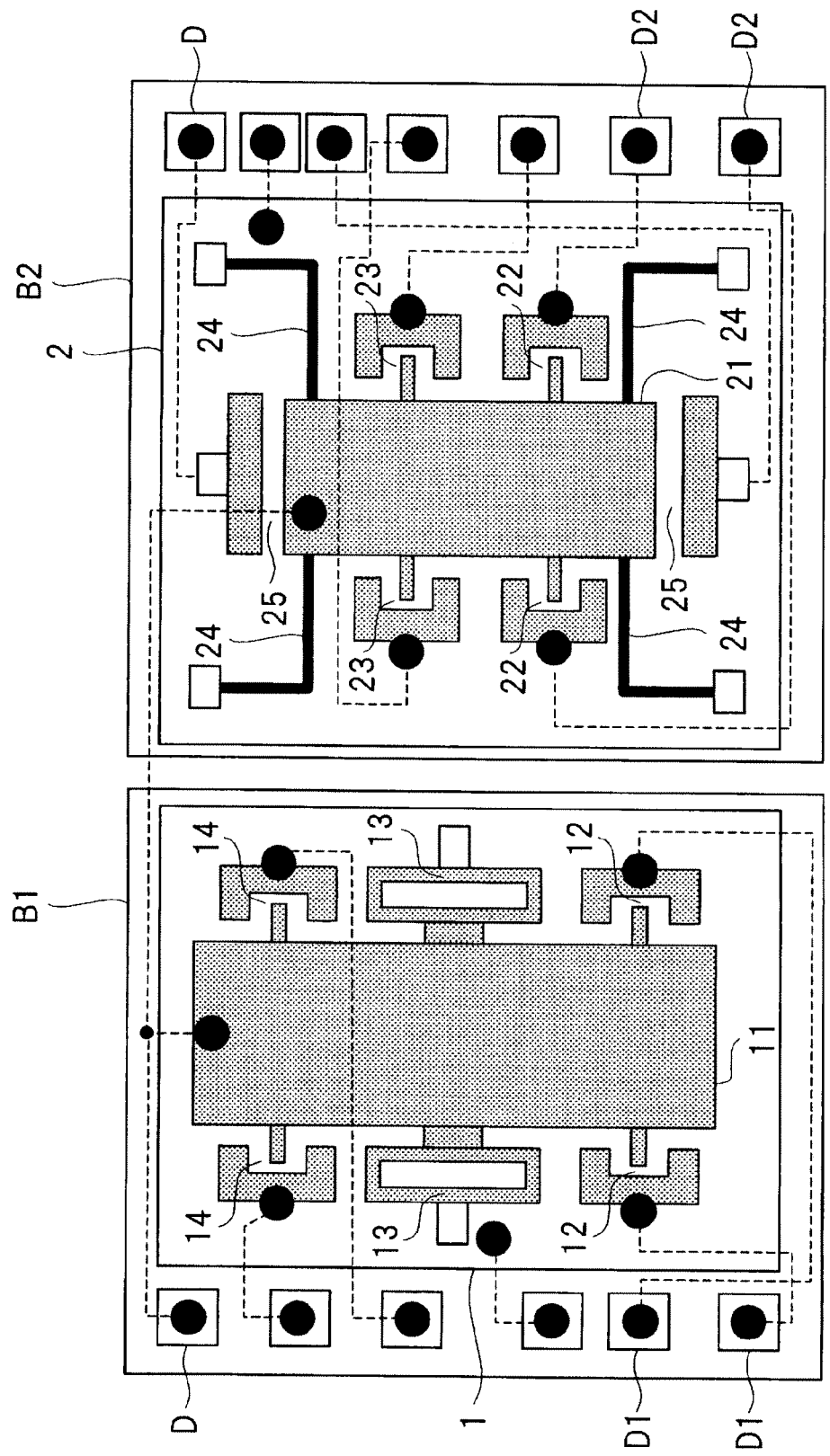
FIG. 2 is a diagram showing in detail an example of the configuration of an acceleration sensor element section of an acceleration detection chip and an angular velocity sensor element section of an angular velocity detection chip in the inertial sensor shown in FIG. 1.

The configuration of the acceleration detection chip B1 in the inertial sensor is explained with reference to FIG. 2. FIG. 2 is a diagram showing in detail an example of the configuration of the acceleration sensor element section 1 of the acceleration detection chip B1 and the angular velocity sensor element section 2 of the angular velocity detection chip B2. In FIG. 2, as components particularly related to the acceleration sensor element section 1 of the acceleration detection chip B1, reference numeral 11 denotes a movable section, 12 denotes diagnosis electrodes for displacing the movable section 11 with an electrostatic force, 13 denotes beams configured to support the movable section 11, and 14 denotes detection electrodes configured to detect a displacement of the movable section 11 as a change in electrode's capacitance.

In FIG. 2, the acceleration sensor element section 1 includes the movable section 11 arranged in the center, two diagnosis electrodes 12 arranged on the lower side to hold the movable section 11 on the left and right, two detection electrodes 14 arranged on the upper side to hold the movable section 11 on the left and right, and two beams 13 configured to support the center of the movable section 11 on the left and right. The movable section 11, the diagnosis electrodes 12, and the detection electrodes 14 are respectively electrically connected to the pads D. For example, the diagnosis electrodes 12 are connected to the pads for diagnosis voltage input D1.

Configuration of the Angular Velocity Detection Chip

The configuration of the angular velocity detection chip B2 in the inertial sensor is explained with reference to FIG. 2. In FIG. 2, as components particularly related to the angular velocity sensor element section 2 of the angular velocity detection chip B2, reference numeral 21 denotes a movable section, 22 denotes driving electrodes configured to apply an electrostatic force for vibrating the movable section 21, 23 denotes monitor electrodes configured to detect a driving direction displacement of the movable section 21 as a capacitance change between the electrodes, 24 denotes beams configured to support the movable section 21, and 25 denotes detection electrodes configured to detect, as a change in an electrode's capacitance, a displacement in a detection direction orthogonal to a driving direction caused by a Coriolis force generated by angular velocity application to the movable section 21.

In FIG. 2, the angular velocity sensor element section 2 includes the movable section 21 arranged in the center, two driving electrodes 22 arranged on the lower side to hold the movable section 21 on the left and right, two monitor electrodes 23 arranged on the upper side to hold the movable section 21 on the left and right, two detection electrodes 25 arranged to hold the movable section 21 above and below the movable section 21, and four beams 24 configured to support the four corners of the movable section 21 in four directions. The movable section 21, the driving electrodes 22, the monitor electrodes 23, and the detection electrodes 25 are respectively electrically connected to the pads D. For example, the driving electrodes 22 are connected to the pads for driving voltage input D2.

Configuration of the Control Circuit Chip

Figure 3:
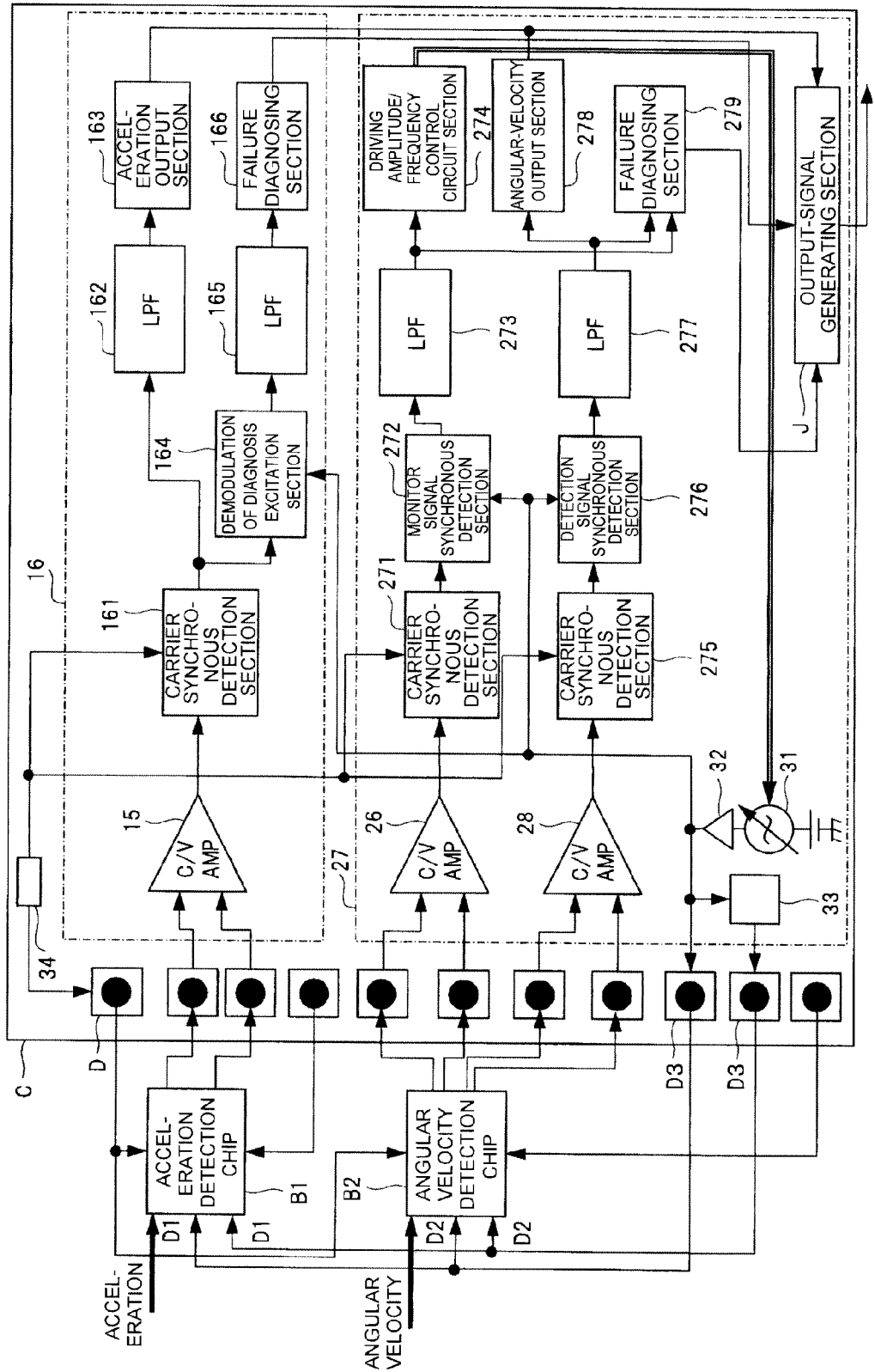
FIG. 3 is a diagram showing in detail an example of the configuration of a control circuit section of a control circuit chip connected to the acceleration detection chip and the angular velocity detection chip in the inertial sensor shown in FIG. 1.

The configuration of the control circuit chip C in the inertial sensor is explained with reference to FIG. 3. FIG. 3 is a diagram showing in detail an example of the configuration of the control circuit section F of the control circuit chip C connected to the acceleration detection chip B1 and the angular velocity detection chip B2 in the inertial sensor. In FIG. 3, as components particularly related to the acceleration sensor element section 1, reference numeral 15 denotes a capacitance to voltage (C/V) conversion circuit configured to convert a capacitance difference of the two detection electrodes 14, which are manufactured to be opposed to each other with respect to the same displacement axis across the movable section 11, into a voltage signal and 16 denotes an acceleration-sensor control circuit section. Further, the control circuit chip C includes a carrier-signal generating section 34 as a peripheral circuit.

On the inside of the acceleration-sensor control circuit section 16, reference numeral 161 denotes a carrier synchronous detection section for removing a carrier signal of the acceleration-sensor control circuit section 16, 162 denotes a LPF (Low Pass Filter) for removing a high-frequency component, which is a noise component, from a signal having an acceleration component, and 163 denotes an acceleration output section configured to output an acceleration signal from which the high-frequency component is removed. Further, reference numeral 164 denotes a demodulation of diagnosis excitation section configured to perform synchronous detection with a diagnosis voltage used for excitation vibration or a signal having the same frequency as diagnosis excitation, 165 denotes an LPF configured to obtain an amplitude component for a frequency component applied to the diagnosis electrodes 12 of the movable section 11 through a second order harmonic and noise cut, and 166 denotes a failure diagnosing section configured to compare the amplitude component and the amplitude in the steady state and, when the amplitude component exceeds a predetermined range, determine that an abnormality occurs in the acceleration sensor element section 1, and notify the output-signal generating section J of the abnormality.

A portion of the control circuit chip C related to the acceleration sensor element section 1 is configured by the C/V conversion circuit 15 and the carrier synchronous detection section 161, the LPF 162, the acceleration output section 163, the demodulation of diagnosis excitation section 164, the LPF 165, and the failure diagnosing section 166 included in the insides of the acceleration-sensor control circuit section 16.

In the portion of the control circuit chip C related to the acceleration sensor element section 1, the components execute operations by the functions in order explained below. An output signal from the acceleration detection chip B1 (the detection electrodes 14) is input to the C/V conversion circuit 15 and processed. An output signal from the C/V conversion circuit 15 is input to the carrier synchronous detection section 161 and processed. An output signal from the carrier-signal generating section 34 is also input to the carrier synchronous detection section 161. An output signal from the carrier synchronous detection section 161 is input to the LPF 162 and processed. An output signal from the LPF 162 is input to the acceleration output section 163 and processed. An output signal from the carrier synchronous detection section 161 is input to the demodulation of diagnosis excitation section 164 and processed. An output signal from the amplifier 32 is also input to the demodulation of diagnosis excitation section 164. An output signal from the demodulation of diagnosis excitation section 164 is input to the LPF 165 and processed. An output signal from the LPF 165 is input to the failure diagnosing section 166 and processed. Output signals from the acceleration output section 163 and the failure diagnosing section 166 are output to the output-signal generating section J.

As components particularly related to the angular velocity sensor element section 2, reference numeral 26 denotes a C/V conversion circuit configured to convert a difference between capacitance change amounts of the opposed monitor electrodes 23 having a differential configuration into a voltage signal (hereinafter, monitor signal), 28 denotes a C/V conversion circuit configured to convert a difference between capacitance change amounts of the opposed detection electrodes 25 having a differential configuration into a voltage signal (hereinafter, detection signal), and 27 denotes an angular-velocity-sensor control circuit section. Further, the control circuit chip C includes a carrier-signal generating circuit 34 as a peripheral circuit.

On the inside of the angular-velocity-sensor control circuit section 27, reference numeral 271 denotes a carrier synchronous detection section for a monitor signal superimposed with a carrier signal, 272 denotes a monitor signal synchronous detection section at a driving frequency of the monitor signal, 273 denotes an LPF for the monitor signal, 274 denotes a driving amplitude/frequency control circuit section configured to control a driving amplitude and a driving frequency of the movable section 21, 275 denotes a carrier synchronous detection section for a detection signal superimposed with a carrier signal, 276 denotes a detection signal synchronous detection section at a driving frequency of a detection signal, 277 denotes an LPF for the detection signal, 278 denotes an angular-velocity output section configured to output an angular velocity signal, and 279 denotes a failure diagnosing section of an angular velocity sensor.

Further, reference numeral 31 denotes a variable amplitude/variable frequency oscillator, 32 denotes an amplifier configured to amplify an output signal of the variable amplitude/variable frequency oscillator 31, and 33 denotes a phase inverter configured to invert a phase of an output signal of the amplifier 32.

A portion of the control circuit chip C related to the angular velocity sensor element section 2 is configured by the C/V conversion circuit 26, the C/V conversion circuit 28, and the carrier synchronous detection section 271, the monitor signal synchronous detection section 272, and LPF 273, the driving amplitude/frequency control circuit section 274, the carrier synchronous detection section 275, the detection signal synchronous detection section 276, the LPF 277, the angular-velocity output section 278, and the failure diagnosing section 279 included in the inside of the angular-velocity-sensor control circuit section 27.

In the portion of the control circuit chip C related to the angular velocity sensor element section 2, the components execute the operations by the functions in order explained below. An output signal from the angular velocity detection chip B2 (the monitor electrodes 23) is input to the C/V conversion circuit 26 and processed. An output signal from the C/V conversion circuit 26 is input to the carrier synchronous detection section 271 and processed. An output signal from the carrier-signal generating section 34 is also input to the carrier synchronous detection section 271. An output signal from the carrier synchronous detection section 271 is input to the monitor signal synchronous detection section 272 and processed. An output signal from the amplifier 32 is also input to the monitor signal synchronous detection section 272. An output signal from the monitor signal synchronous detection section 272 is input to the LPF 273 and processed. An output signal from the LPF 273 is input to the driving amplitude/frequency control circuit section 274 and the failure diagnosing section 279 and processed.

An output signal from the angular velocity detection chip B2 (the detection electrodes 25) is input to the C/V conversion circuit 28 and processed. An output signal from the C/V conversion circuit 28 is input to the carrier synchronous detection section 275 and processed. An output signal from the carrier-signal generating section 34 is also input to the carrier synchronous detection section 275. An output signal from the carrier synchronous detection section 275 is input to the detection signal synchronous detection section 276 and processed. An output signal from the amplifier 32 is also input to the detection signal synchronous detection section 276. An output signal from the detection signal synchronous detection section 276 is input to the LPF 277 and processed. An output signal from the LPF 277 is input to the angular-velocity output section 278 and the failure diagnosing section 279 and processed. Output signals from the angular-velocity output section 278 and the failure diagnosing section 279 are output to the output-signal generating section J.

An output signal from the driving amplitude/frequency control circuit section 274 is used for control of the variable amplitude/variable frequency oscillator 31. An output signal from the variable amplitude/variable frequency oscillator 31 is input to the amplifier 32 and processed. An output signal from the amplifier 32 is input to the phase inverter 33 and processed. The output signal from the amplifier 32 and an output signal output through the phase inverter 33 are output to the angular velocity detection chip B2 (the pads for driving voltage input D2 to the driving electrodes 22) and the acceleration detection chip B1 (the pads for diagnosis voltage input D1 to the diagnosis electrodes 12) through the pads for driving voltage output D3.

Operation of the Acceleration Sensor

A basis operation of the acceleration sensor is explained below with reference to FIGS. 1, 2, and 3. The operations of the acceleration sensor element section 1 of the acceleration detection chip B1 and the portion of the control circuit chip C related to the acceleration sensor element section 1 shown in FIGS. 1 to 3 are explained below.

In this embodiment, the acceleration sensor element section 1 configured to detect acceleration from the outside is a so-called MEMS type element of a capacitance type manufactured by micromachining a semiconductor such as silicon and configured to grasp, as a capacitance change of the detection electrodes 14, displacement of the movable section caused by the application of acceleration. In this embodiment, an alternating-current signal is applied to the acceleration sensor element section from the carrier-signal generating section 34 and a response to the application of an alternating-current voltage is measured to detect applied acceleration. A specific example is explained below.

As an example, a 500 kHz carrier signal is applied. At this point, a frequency selected as the carrier signal is desirably a higher frequency than a natural frequency of the movable section 11 to respond. This is because, in a diagnosis of the acceleration sensor element section 1 explained below, since the movable section 11 is vibrated to perform detection of a mechanical failure, a carrier signal having a frequency higher than the frequency of vibration is necessary in order to detect the displacement of the movable section 11. By selecting such a frequency, it is possible to prevent displacement of the movable section 11 by an electrostatic force due to the application of the carrier signal. As a result it is possible to stabilize an output of the sensor.

In order to detect a capacitance change as a response to the carrier signal, the capacitance change is converted into a voltage signal by the C/V conversion circuit 15. An amplifier circuit (AMP) may be incorporated in the C/V conversion circuit 15 (an example of the C/V conversion circuit 15 incorporating the amplifier circuit is shown in FIG. 3). In this case, a signal output from the acceleration sensor element section 1 is converted into an appropriate voltage level. The amplification degree of the amplifier circuit may be variable such that a range can be changed according to an applied application.

The control circuit section F may be configured to directly treat an analog voltage signal or may be configured to insert an ADC circuit into an input stage to the acceleration-sensor control circuit section 16 (not shown in the figure and shown in FIG. 7 referred to below) and convert subsequent signals into digital signals and treat the digital signals. In embodiments explained below, packaging by the digital signal is assumed. However, description of the embodiments is generalized as much as possible to make it unnecessary to distinguish the analog signal and the digital signal. If processing and a configuration are different for the analog signal and the digital signal, the processing and the configuration are explained every time that occurs.

Subsequently, an acceleration signal converted into the appropriate voltage level and superimposed with the carrier signal is multiplied with a signal synchronized with the carrier signal and having a frequency same as the frequency of the carrier signal by the carrier synchronous detection section 161 and output through an LPF (not shown in the figure). In this embodiment, an output of the carrier-signal generating section 34 shown in FIG. 3 is directly input to the carrier synchronous detection section 161. However, in the case of a digital circuit, it is also possible to realize synchronous detection in digital signal processing using only a clock component of the output as a latch signal of the carrier synchronous detection section 161. This principle is common in all kinds of synchronous detection of this application.

In the synchronous detection processing explained above, since only a carrier signal component can be removed, only displacement of the movable section 11 necessary for an original sensor signal appears as a voltage signal.

Finally, in order to drop a frequency component of a signal to a band necessary for the sensor signal and reduce high-frequency noise, a signal equivalent to acceleration is output as an output of the sensor from the acceleration output section 163 through the LPF 162. The LPF 162 gives two effects, i.e., an effect of removing a high-frequency noise component and an effect of removing an excitation signal for a mechanical diagnosis explained below. Packaging of the LPF 162 does not depend on a filter configuration and the order of the filter. As an example, there is a Butterworth primary filter. For example, the signal is an analog signal, the acceleration output section 163 sends a voltage value to the output-signal generating section J. If the signal is a digital signal, the acceleration output section 163 sends a digital value to the output-signal generating section J.

A function of the demodulation of diagnosis excitation section 164 is explained. The acceleration sensor element section 1 is a micro-machine including a movable body manufactured by the semiconductor micromachining technique. Therefore, the acceleration sensor element section 1 is likely to cause various failure modes such as a sensitivity change and a resonant frequency change due to breakage of a part of a beam, fixing of a sensor output value caused by sticking due to charge-up or the like, and a change in sealing pressure. The failure modes are failures that can be detected only when the movable section is actuated. When the deficiencies occur, for example, if the sensor is used for vehicle control, in the worst case, although there is no abnormality in a traveling state of a vehicle, it is determined that the acceleration sensor element section 1 is in an abnormal state. This is likely to cause deficiencies that intervention in driver operation and startup of a safety device are started. Therefore, it is important to surely detect occurrence of such mechanical failure modes and notify a host system of the failure modes.

Therefore, in this embodiment, as shown in FIG. 2, the diagnosis electrodes 12 for displacing the movable section 11 with an electrostatic force are separately provided. The diagnosis electrodes 12 are special electrodes for failure diagnosis not included in a normal sensor. The displacement of the movable section 11 by an electrostatic force can be realized by applying a voltage to the diagnosis electrodes 12 to cause a potential difference between the diagnosis electrodes 12 and the movable section 11. Occurrence of a mechanical abnormality mode can be detected by detecting this displacement through the detection electrodes 14 and checking whether appropriate displacement is performed with respect to the voltage applied to the diagnosis electrodes 12. It goes without saying that, in a failure diagnosis according to this embodiment, breaking of wire, short-circuit, and the like of a circuit section can be detected.

When alternating-current signals having the resonant frequency component are applied to the diagnosis electrodes 12 at a predetermined voltage, the movable section 11 of the acceleration sensor element section 1 vibrates with a frequency of the alternating-current signals applied to the diagnosis electrodes 12. However, at this point, if a mechanical failure such as breakage of the beams 13 occurs, a predetermined amplitude gain is not obtained because a resonant frequency changes. As a result, a displacement with respect to a diagnosis voltage of the movable section 11 detected through the detection electrodes 14 is different from a predetermined value. When a sticking phenomenon occurs, a displacement detected through the detection electrodes 14 is fixed. Therefore, as a result, a displacement detected through the detection electrodes 14 is also different from the predetermined value.

In order to detect this failure, the demodulation of diagnosis excitation section 164 performs synchronous detection with a diagnosis voltage used for excitation vibration or a signal having the same frequency component. The LPF 165 performs an amplitude component for a frequency applied to the diagnosis electrodes 12 of the movable section 11 through a second order harmonic and noise cut. The failure diagnosis section 166 compares the amplitude component with the amplitude of the steady state. When the amplitude component exceeds a predetermined range, the failure diagnosis section 166 determines that an abnormality occurs in the acceleration sensor element section 1 and notifies the output-signal generating section J of the abnormality. As a comparison circuit used at this point, it is suitable to provide, as an analog circuit, a comparator circuit (not shown in the figure) and provide, as a digital circuit, a comparison circuit for comparison with a predetermined value stored in a PROM (Programmable Read Only Memory) or a flash memory. However, contents of the present invention disclosed in this application do not depend on a comparison circuit and a mechanism for comparison.

Operation of the Angular Velocity Sensor

A basic operation of the angular velocity sensor is explained with reference to FIGS. 1, 2, and 3. The operations of the angular velocity sensor element section 2 of the angular velocity detection chip B2 and the portion of the control circuit chip C related to the angular velocity sensor element section 2 shown in FIGS. 1 to 3 are explained below.

The angular velocity sensor element section 2 explained in this embodiment is a so-called MEMS type element of a capacitance type manufactured by micromachining a semiconductor such as silicon and configured to grasp, as a capacitance change of the detection electrodes 25, displacement of the movable section 21 caused by the application of an angular velocity. In detection of an angular velocity, a principle for measuring a Coriolis force explained below is used. That is, when the movable section 21 is vibrated under control at a fixed frequency and a fixed amplitude in a uniaxial direction (hereinafter, driving direction), if application of an angular velocity occurs, a Coriolis force F corresponding to an angular velocity Q, a displacement velocity v of the movable section 21, and mass m of the movable section 21 is applied to the movable section 21 in the following relation:

$$F = -2 \times m \times v \times \Omega \quad (1)$$

When an axis of occurrence of an angular velocity is a Z axis of an orthogonal coordinate system indicated by X-Y-Z axes, if the vibration is set in an X direction on an X-Y plane, the Coriolis force at this point is in a Y direction (hereinafter, detecting direction). According to the force in the Y direction, displacement of the movable section 21 in the detecting direction occurs in addition to displacement in the driving direction. A displacement in the steady state in the detecting direction orthogonal to the driving direction is proportional to the Coriolis force generated by the applied angular velocity. Therefore, it is possible to obtain the applied angular velocity by measuring the displacement in the detecting direction.

In the configuration of the angular velocity sensor element section 2 shown in FIG. 2 and the configuration of the control circuit chip C related to the angular velocity sensor element section 2 shown in FIG. 3, as shown in FIG. 3, the carrier-signal generating section 34 may be shared by an acceleration sensor and an angular velocity sensor housed in one package. An advantage unique to an integrated sensor can be enjoyed. At this point, a carrier signal can be shared by the acceleration sensor and the angular velocity sensor by parallelizing bonding wires or parallelizing wires in the package.

As explained above, in the angular velocity sensor, in order to accurately detect an applied angular velocity, the frequency and the amplitude of the movable section 21 need to be kept constant. In this embodiment, an oscillation circuit control amount for vibrating the movable section 21 of the angular velocity sensor at a predetermined frequency and a predetermined amplitude is output from the angular-velocity-sensor control circuit section 27 and input to the variable amplitude/variable frequency oscillator 31. In particular, a circuit including control for oscillating the movable section 21 at the predetermined frequency simply configures a PLL (Phase-Locked Loop) circuit including a phase comparator, a filter, and a variable oscillator. In realizing large-amplitude vibration at a low driving voltage, a target frequency of an oscillation circuit is suitably a frequency at which a maximum amplitude in a driving side response of movable section displacement, i.e., a resonant frequency of the angular velocity sensor element section 2 shown in FIG. 2. However, in principle, the angular velocity sensor does not always need vibration at the natural frequency. It is possible to obtain the function of the angular velocity sensor by vibrating the movable section 21 in the driving direction at the predetermined frequency and the predetermined amplitude. Therefore, this embodiment does not limit the frequency for driving the movable section 21. For example, an embodiment is also conceivable in which a signal of a crystal clock source capable of generating an extremely stable frequency is divided to generate a frequency for vibrating the movable section 21 of the angular velocity sensor and an electric signal having this frequency component is applied to the driving electrodes 22.

In the configuration of the angular-velocity-sensor control circuit section 27 in the control circuit chip C shown in FIG. 3, first, in order to vibrate the movable section 21, an output signal of the variable amplitude/variable frequency oscillator 31 is output through the amplifier 32 and the phase inverter 33 and driving voltages having an opposite phase relation each other are applied to the driving electrodes 22 set opposed to each other. Consequently, the movable section 21 vibrates at a frequency of an alternating-current signal output by the oscillator 31. A displacement by this vibration is represented as a capacitance change of the monitor electrodes 23. This capacitance change is converted into a voltage signal having the frequency of the alternating-current signal by the C/V conversion circuit 26. Like the amplifier circuit of the acceleration sensor, an amplifier circuit (AMP) configured to convert the voltage signal into an appropriate voltage level may be incorporated in the C/V conversion circuit 26 (an example of the C/V conversion circuit 26 incorporating the amplifier circuit is shown in FIG. 3). The amplification degree of the amplifier circuit may be variable.

Subsequently, a monitor signal converted into the appropriate voltage level and superimposed with the carrier signal is multiplied with a signal synchronized with the carrier signal and having a frequency same as the frequency of the carrier signal by the carrier synchronous detection section 271 and output through an LPF (not shown in the figure) to remove a second order harmonic component and a noise component. In the processing explained above, a carrier signal component is removed and only an amplitude component of driving direction displacement of the movable section 21 originally necessary for the monitor signal appears as the voltage signal.

After passing though the not-shown LPF, the monitor signal is subjected to synchronous detection by a detection signal synchronizing with the driving signal and having a frequency component same as a frequency component of the driving signal in the monitor signal synchronous detection section 272 again. Further, the monitor signal is output through the LPF 273 configured to remove a second order harmonic component and a noise component. The driving amplitude/frequency control circuit section 274 obtains amplitude information and phase information of driving direction vibration of the angular velocity sensor element section 2 included in the monitor signal and outputs a frequency control amount and an amplitude control amount to the variable amplitude/variable frequency oscillator 31. Consequently, the variable section 21 of the angular velocity sensor element section 2 of the angular velocity sensor can maintain a predetermined frequency in the driving direction, in particular, vibration of a fixed amplitude at a resonant frequency.

The displacement of the movable section 21 due to the application of the angular velocity appears as a capacitance change of the detection electrodes 25. This capacitance change is converted into a voltage signal having the frequency of the alternating-current signal by the C/V conversion circuit 28. Like the amplifier circuit for the monitor signal, an amplifier circuit (AMP) configured to convert the voltage signal into an appropriate voltage level may be incorporated in the C/V conversion circuit 28 (an example of the C/V conversion circuit 28 incorporating the amplifier circuit is shown in FIG. 3). The amplification degree of the amplifier circuit may be variable.

Subsequently, a detection signal converted into the appropriate voltage level and superimposed with the carrier signal is multiplied with a signal synchronized with the carrier signal and having a frequency same as the frequency of the carrier signal by the carrier synchronous detection section 275 and output through an LPF (not shown in the figure) to remove a second order harmonic component and a noise component. In the processing explained above, a carrier signal component is removed and only an amplitude component of detecting direction displacement of the movable section 21 originally necessary for the detection signal appears as the voltage signal.

After passing though the not-shown LPF, the detection signal is subjected to synchronous detection by a detection signal synchronizing with the driving signal and having a frequency component same as a frequency component of the driving signal in the detection signal synchronous detection section 276 again. Further, the detection signal is output through the LPF 277 configured to remove a second order harmonic component and a noise component. The angular-velocity output section 278 outputs amplitude information to the output-signal generating section J as angular velocity information after subjecting the amplitude information to predetermined zero point adjustment and gain adjustment.

The monitor signal output through the LPF 273 and the detection signal output through the LPF 277 are also input to the failure diagnosing section 279 configured to perform a failure diagnosis for the angular velocity sensor. The failure diagnosis is also carried out. At this point, the LPFs 273 and 277 may have different characteristics for a diagnosis use. The detection signal may be a signal before synchronous detection or may be a signal before passing through the LPF. The failure diagnosing section 279 monitors that, for example, displacement in the driving direction is at a predetermined frequency and a predetermined amplitude and displacement in the detecting direction is within a range of a predetermined value.

Failure Diagnoses of the Acceleration Sensor and the Angular Velocity Sensor

Failure diagnoses of the acceleration sensor and the angular velocity sensor in the operations of the acceleration sensor and the angular velocity sensor are explained.

When an abnormality is detected by the failure diagnosing section 166 of the acceleration sensor or the failure diagnosing section 279 of the angular velocity sensor, if the output-signal generating section J outputs an analog voltage signal, a voltage in an extreme voltage range not generated in a normal use range is output or a port for a digital output is separately provided and, when an abnormality occurs, a signal of the port is changed (e.g., from a high voltage to a low voltage) to notify the host system of the abnormality. When the output-signal generating section J outputs a digital signal value, so-called flag notification for changing predetermined bits being communicated to a logic different from a logic at normal time is performed or all bit outputs are set to a predetermined value, for example, a maximum value of predetermined bit width such as 0x7FFF to notify the host system of the abnormality.

When no abnormality is detected by both the failure diagnosing sections 166 and 279, the output-signal generating section J outputs information concerning acceleration and an angular velocity. If the output-signal generating section J is configured to, for example, output a digital signal, the output-signal generating section J is hardware for SPI (Serial Peripheral Interface) communication or hardware for CAN (Controller Area Network) communication. However, the output-signal generating section J does not particularly limit communication means for the communication. If the acceleration-sensor control circuit section 16 is packaged in signal processing for an analog signal, an analog voltage signal may be output. In this case, as an example, a method of realizing notification to the host system by separately providing a port for a digital output and, when an abnormality occurs, changing a signal of the port (from H to L or L to H) is conceivable. If an analog value is output, it is conceivable to package the output-signal generating section J as a port for outputting a voltage value. However, the example explained herein does not particularly limit communication means of the output-signal generating section J.

The diagnosis of the acceleration sensor is explained again. A detection range of the acceleration sensor to be measured by the acceleration sensor is as large as several tens G to several hundred G, the beams 13 that support the movable section 11 has to be designed to be hard to prevent displacement of the movable section 11 from being saturated when large acceleration is applied. However, when it is attempted to obtain displacement of the movable section 11 by applying a voltage to the diagnosis electrodes 12, because the beams 13 are hard, the applied voltage needs to be higher than the voltage in the past or the capacitance of the diagnosis electrodes 12 needs to be increased. The former needs, for example, a circuit configured to output a high voltage exceeding a power supply voltage. The latter needs to secure a large area of chip in order to obtain electrode capacitance. Both the approaches have a disadvantage that manufacturing costs for the sensor are increased.

Therefore, in this embodiment, resonant motion, which is vibration at a natural frequency of the movable section 11, is utilized. The resonant motion is a phenomenon in which, when the movable section 11 is vibrated at a resonant frequency determined by the mass of the movable section 11, the beams 13, and sealing pressure of the acceleration sensor element section 1, a predetermined amplitude gain (called Q value) is obtained with respect to displacement that occurs when a direct-current electrostatic force is applied.

Figure 4:
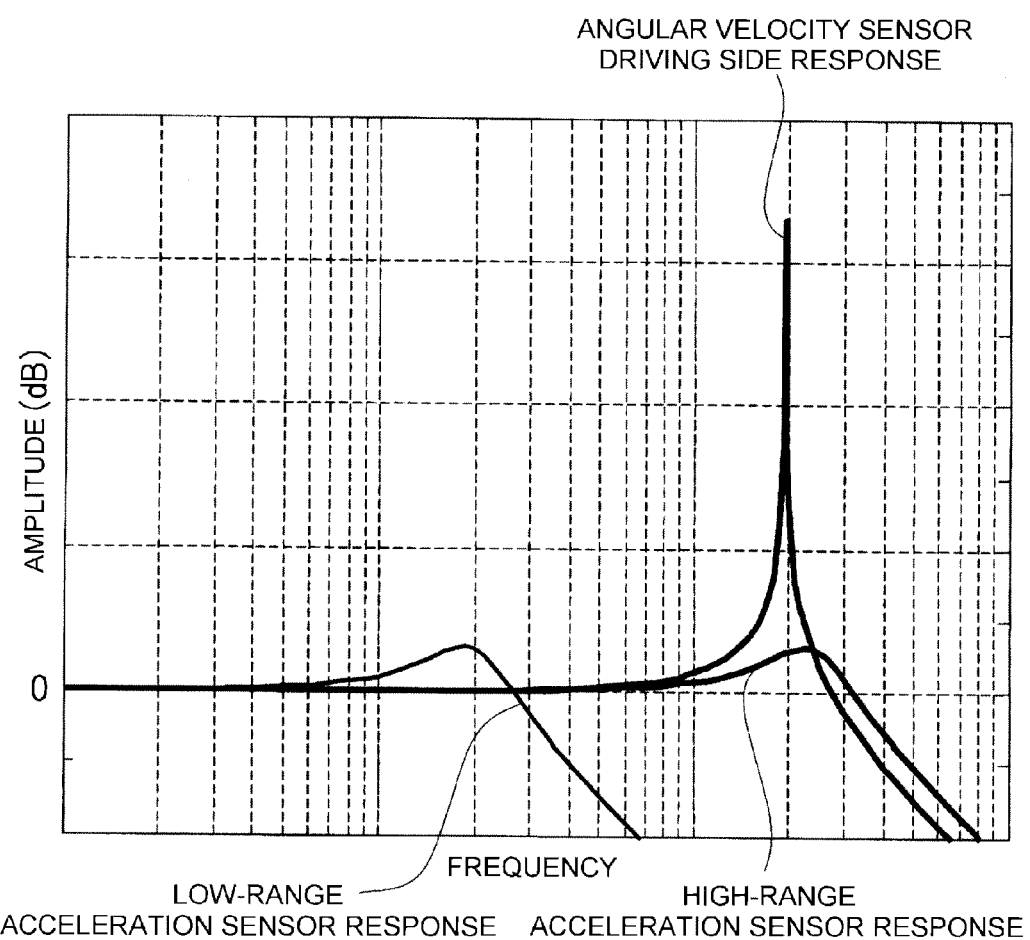
FIG. 4 is a graph showing an example of frequency responses of an angular velocity sensor, a high-range acceleration sensor, and a low-range acceleration sensor in the explanation of the inertial sensor shown in FIG. 1.

FIG. 4 is a graph showing an example of frequency responses of an angular velocity sensor, a high-range acceleration sensor, and a low-range acceleration sensor (the abscissa: frequency, the ordinate: amplitude). As shown in FIG. 4, in general, since a beam of the low-range acceleration sensor is soft, a resonant frequency of the low-range acceleration sensor is low with respect to a resonant frequency of the angular velocity sensor. On the other hand, in general, a beam of the high-range acceleration sensor is hard, a resonant frequency of the high-range acceleration sensor is high. It is easy to obtain a resonant frequency of the acceleration sensor element section 1 close to the resonant frequency of the angular velocity sensor through designing of a beam structure. Therefore, as explained below, a resonant frequency of the angular velocity sensor element section 2, which needs to be vibrated strictly at the resonant frequency, and a resonant frequency of the acceleration sensor element section 1, which can sufficiently realize a failure diagnosis with vibration in a range in which a gain is roughly obtained, are designed in advance to be equal. Consequently, it is possible to directly use an oscillator output of the angular velocity sensor as a diagnosis voltage of the acceleration sensor.

If a PLL circuit locked to the resonant frequency of the acceleration sensor is manufactured only for a diagnosis of the acceleration sensor, the circuit section is complicated and an increase in costs is caused. On the other hand, if the configuration explained above is adopted, it is possible to vibrate the acceleration sensor only at minimum wiring costs.

When a sealing pressure force is as high as the atmospheric pressure, a Q value indicating a kurtosis of a gain is not so high. Under a condition of such a low Q value, even in vibration at a frequency deviating from the resonant frequency, a loss from an original amplitude gain hardly occurs. For example, FIG. 4 shows a state in which the resonant frequency of the angular velocity sensor element section 2 and the resonant frequency of the acceleration sensor element section 1 do not coincide with each other as explained above. As shown in the figure, there is little difference of the gain when the acceleration sensor element section 1 of the high-range acceleration sensor is excited at the resonant frequency of the angular velocity sensor and when the acceleration sensor element section 1 is excited at the resonant frequency of the acceleration sensor. Therefore, even if machining fluctuation occurs in which the resonant frequency of the acceleration sensor element section 1 deviates from the resonant frequency of the angular velocity sensor element section 2, since a fluctuation amount of an amplitude gain actually obtained by the acceleration sensor element section 1 is small, it is possible to easily absorb such machining fluctuation.

A configuration for directly using an output of the variable amplitude/variable frequency oscillator 31 of the angular velocity sensor as a diagnosis voltage of the acceleration sensor is explained. In this embodiment, a voltage applied to the diagnosis electrodes 12 is an alternating-current signal having the resonant frequency component. When the diagnosis electrodes 12 opposed to each other in the same displacement direction is provided as shown in FIG. 2, it is desirable in terms of energy efficiency that alternating-current signals applied to the diagnosis electrodes 12 are alternating-current signals in opposite phases each other.

Therefore, in this embodiment, a driving voltage including an alternating-current component applied to the driving electrodes 22 in order to drive the angular velocity sensor element section 2 is used for voltage signals applied to the diagnosis electrodes 12 of the acceleration sensor element section 1. Specifically, the resonant frequency of the acceleration sensor element section 1 is present in the vicinity of the resonant frequency of the angular velocity sensor element section 2. More specifically, when the acceleration sensor element section 1 is excited at an arbitrary driving frequency for driving the angular velocity sensor element section 2 or the resonant frequency of the angular velocity sensor element section 2, a response gain to the excitation is set to exceed 0 dB (a gain of a response of the acceleration sensor element section 1 is equal to or larger than 1).

In order to realize the above, in this embodiment, an output of the pads for driving voltage output D3 for outputting a driving voltage for the control circuit chip C is given to the pads for diagnosis voltage input D1 for receiving a diagnosis voltage of the acceleration detection chip B1 in parallel to the pads for driving voltage input D2 for receiving a driving voltage for the angular velocity detection chip B2. Therefore, the bonding wires E are not only connected to the pads for driving voltage output D3 of the control circuit chip C and the pads for driving voltage input D2 of the angular velocity detection chip B2 but also connected to the pads for diagnosis voltage input D1 of the acceleration detection chip B1 in parallel. At this point, it is suitable to provide a plurality of pads for driving voltage output D3 of the control circuit chip C or secure the size of the electrodes larger than the size of the other electrodes because wire bonding is easy.

Modification of the Inertial Sensor

Figure 5:
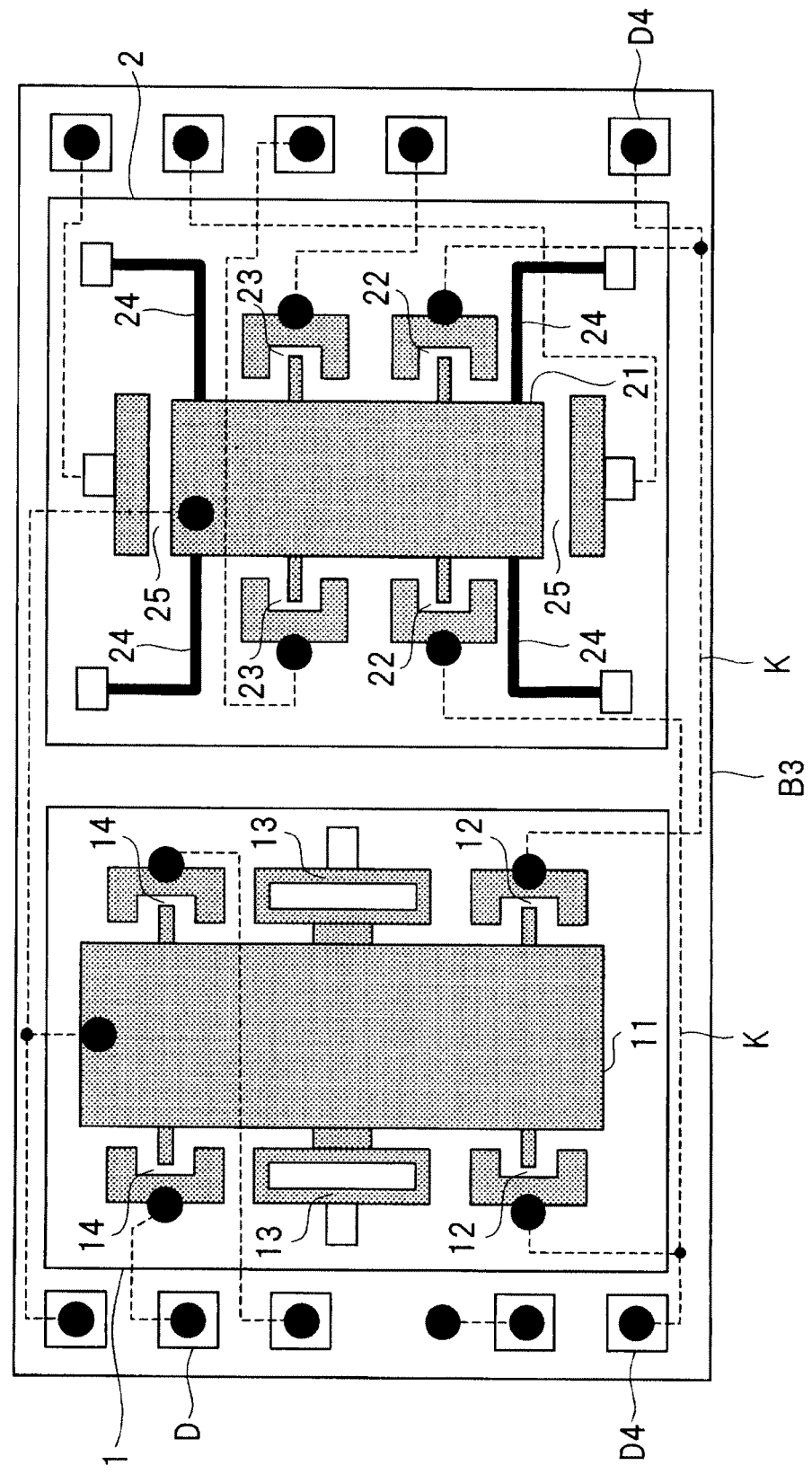
FIG. 5 is a diagram showing an example of the configuration of a modification of the inertial sensor shown in FIG. 2 in which the acceleration sensor element section and the angular velocity sensor element section are housed in the same chip.
Figure 6:
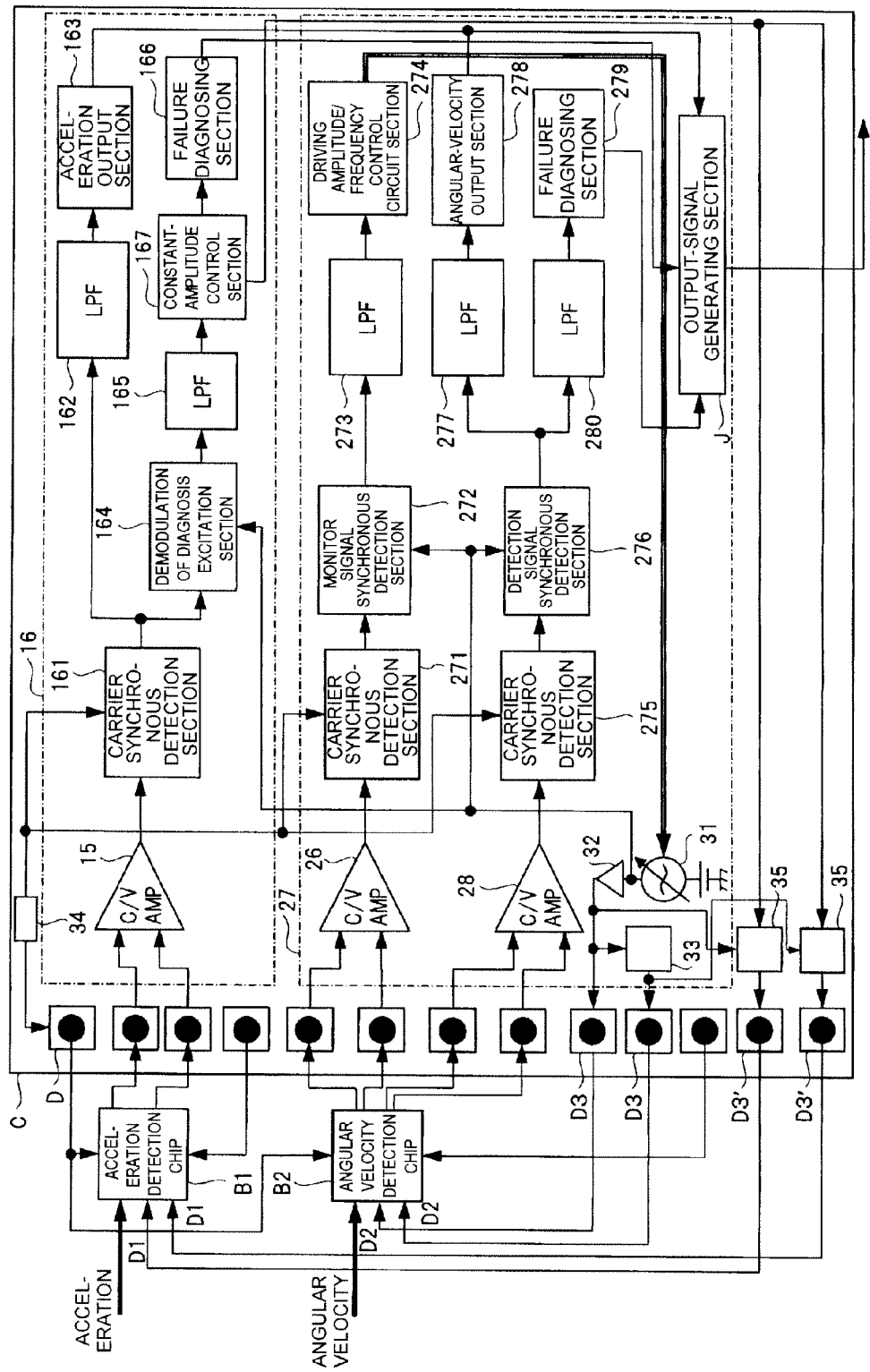
FIG. 6 is a diagram showing an example of the configuration of a modification of the inertial sensor shown in FIG. 3 in which constant-amplitude control is performed in a diagnosis of the acceleration sensor element section.

A modification of the inertial sensor is explained with reference to FIGS. 5 and 6. FIG. 5 is a diagram showing an example of the configuration of the acceleration sensor element section 1 and the angular velocity sensor element section 2 housed in the same chip. FIG. 6 is a diagram of an example of the configuration in which constant-amplitude control is performed in a diagnosis of the acceleration sensor element section 1.

In this embodiment, a method of applying the same voltage to the pads for driving voltage input D2 of the angular velocity detection chip B2 and the pads for diagnosis voltage input D1 of the acceleration detection chip B1 is not limited to parallelization of driving voltages by wire bonding and may be, for example, parallelization by wire patterns in a package. Therefore, the method does not depend on a wiring method.

In particular, as shown in FIG. 5, when the acceleration sensor element section 1 and the angular velocity sensor element section 2 are manufactured in the same chip B3, the same voltage signal can be applied to pads for diagnosis voltage input of an acceleration detection chip and pads for driving voltage input of an angular velocity detection chip by a wire K in the chip B3. Therefore, common pads (for diagnosis voltage input and for driving voltage input) D4 connected to the wire K are provided. The common pads D4 are respectively connected to the diagnosis electrodes 12 of the acceleration sensor element section 1 and the driving electrodes 22 of the angular velocity sensor element section 2 through the wire K in the chip B3. By providing the common pads D4 connected to the wire K, it is possible to realize the configurations and the functions explained above without increasing the number of bonding wires and without increasing packaging costs. Even if all elements are integrated in one chip as in the "surface MEMS" and the "CMOS-compatibleMEMS", the same functions can be realized by simply wiring the elements.

Further, as shown in FIG. 6, a constant-amplitude control section (an amplitude control circuit) 167 for maintaining constant a displacement by a diagnosis voltage may be added at the pre-stage of the failure diagnosing section 166 to give the diagnosis voltage to the pads for diagnosis voltage input D1 of the acceleration detection chip B1 after the diagnosis voltage passes through constant-voltage adjusting circuits 35. That is, the constant-amplitude control section 167 is connected between the LPF 165 and the failure diagnosing section 166 and the constant-voltage adjusting circuits 35 are respectively connected between the amplifier 32 and phase inverter 33 and two pads for driving voltage output D3' for giving a diagnosis voltage to the pads for diagnosis voltage input D1 of the acceleration detection chip B1. The constant-voltage adjusting circuits 35 are controlled by a control signal from the constant-amplitude control section 167. Outputs from the constant-voltage adjusting circuits 35 are given to the pads for diagnosis voltage input D1 of the acceleration detection chip B1. In this way, the control for keeping only an amplitude constant without changing a frequency and a phase of the diagnosis voltage, which is an alternating-current signal, is applied. Consequently, a displacement threshold of an output of the constant-amplitude control section 167, which is a determination material for abnormality detection in the failure diagnosing section 166, is always fixed without depending on a driving voltage of the angular velocity sensor element section 2. Therefore, it is possible to simplify the configuration of the failure diagnosing section 166.

In FIG. 6, concerning a failure diagnosis of the angular velocity sensor, the configuration having different characteristics for diagnosis uses is adopted. That is, in the configuration of the angular-velocity-sensor control circuit section 27, an LPF 280 is added and an output signal from the monitor signal synchronous detection section 272 is input to only the LPF 273 and processed. An output signal from the LPF 273 is input to only the driving amplitude/frequency control circuit section 274 and processed. An output signal from the detection signal synchronous detection section 276 is input to the LPF 277 and the LPF 280 and processed. An output signal from one LPF 277 is input to only the angular-velocity output section 278 and processed. An output signal from the other LPF 280 is input to only the failure diagnosis section 279 and processed. In this way, the driving amplitude/frequency control circuit section 274, the angular-velocity output section 278, and the failure diagnosing section 279 are respectively connected to the different LPFs 273, 277, and 280. Therefore, concerning a failure diagnosis of the angular velocity sensor, the configuration having different characteristics for diagnosis uses can be adopted. Naturally, a configuration in which a failure diagnosing section configured to monitor that a driving amplitude and a driving frequency are within predetermined ranges is provided following the monitor signal synchronous detection section 272 is also conceivable.

Effects of the First Embodiment

According to the embodiment explained above, in the configuration including the acceleration sensor element section 1 including the movable section 11 and the diagnosis electrodes 12, the angular velocity sensor element section 2 including the movable section 21 and the driving electrodes 22, and the control circuit section F, a voltage signal input to the driving electrodes 22 and a voltage signal input to the diagnosis electrodes 12 are the same voltage signal, the voltage signal input to the diagnosis electrodes 12 is a signal for detecting a mechanical failure, and a carrier signal for detecting displacement of the movable section 11 has a frequency higher than the frequency of a signal applied to the diagnosis electrodes 12. Consequently, it is possible to obtain effects explained below.

That is, as an effect of the present invention, in the inertial sensor that detects acceleration by the acceleration sensor element section 1 and an angular velocity by the angular velocity sensor element section 2, it is possible to realize, at low costs, a mechanical diagnosis of the acceleration sensor element section 1 including the hard beams for detecting a high range. That is, it is possible to solve the problem that manufacturing costs increases in realizing a mechanical diagnosis of the acceleration sensor including the hard beam in the past.

More suitably, an effect explained below can be obtained. The voltage signal input to the driving electrodes 22 of the angular velocity sensor element section 2 can be set to a voltage signal synchronizing with a natural frequency of the angular velocity sensor element section 2. The natural frequency of the acceleration sensor element section 1 can be set to the frequency at which a gain is obtained more than 0 dB in a frequency component of the voltage signal input to the driving electrodes 22 of the angular velocity sensor element section 2. The natural frequency of the acceleration sensor element section 1 can be set to the frequency at which a gain is obtained more than 0 dB at a resonant frequency of the angular velocity sensor element section 2.

The control circuit section F includes the constant-amplitude control section 167 configured to adjust the amplitude of a voltage signal to control the vibration amplitude of the acceleration sensor element section 1 to be fixed. Therefore, the voltage signal input to the diagnosis electrodes 12 of the acceleration sensor element section 1 can be set to a voltage signal output through the constant-amplitude control section 167.

Further, in the configuration in which the diagnosis electrodes 12 of the acceleration sensor element section 1 are connected to the pads for diagnosis voltage input D1 on the acceleration detection chip B1 and the driving electrodes 22 of the angular velocity sensor element section 2 are connected to the pads for driving voltage input D2 on the angular velocity detection chip B2, the pads for diagnosis voltage input D1 and the pads for driving voltage input D2 can be respectively connected to the pads for driving voltage output D3 on the control circuit chip C of the control circuit section F by the bonding wires E.

In the configuration in which the acceleration sensor element section 1 and the angular velocity sensor element section 2 are formed on the same chip B3 and the control circuit section F is formed on the control circuit chip C, the diagnosis electrodes 12 of the acceleration sensor element section 1 and the driving electrodes 22 of the angular velocity sensor element section 2 can be connected to the common pads D4 on the same chip B3 by wires K. The common pads D4 can be connected to the pads for driving voltage output D3 on the control circuit chip C by the bonding wires E.

Further, two pads are provided as each of the pads for diagnosis voltage input D1, the pads for driving voltage input D2, the pads for driving voltage output D3, and the common pads D4. Therefore, alternating-current signals in opposite phases each other can be applied to the diagnosis electrodes 12 of the acceleration sensor element section 1 and the driving electrodes 22 of the angular velocity sensor element section 2. This is desirable in terms of energy efficiency.

Second Embodiment

An inertial sensor in a second embodiment is explained with reference to FIG. 7. In the second embodiment, an example in which the acceleration-sensor control circuit section 16 and the angular-velocity-sensor control circuit section 27 in the first embodiment are configured by digital circuits is explained.

All of the external package A, the acceleration detection chip B1 including the acceleration sensor element section 1, the angular velocity detection chip B2 including the angular velocity sensor element section 2, the pads D on the chips, in particular, the pads for diagnosis voltage input D1 of the acceleration detection chip B1, the pads for driving voltage input D2 of the angular velocity detection chip B2, and the pads for driving voltage output D3 of the control circuit chip C, the bonding wires E, the control circuit section F in the control circuit chip C, the external power supply G, the regulator circuit section H configured to adjust the external power supply, the output-signal generating section J in the control circuit chip C, and the output signal I are the same as those in the first embodiment. Therefore, explanation of these components is omitted. In the following explanation, differences from the first embodiment are mainly explained.

Figure 7:
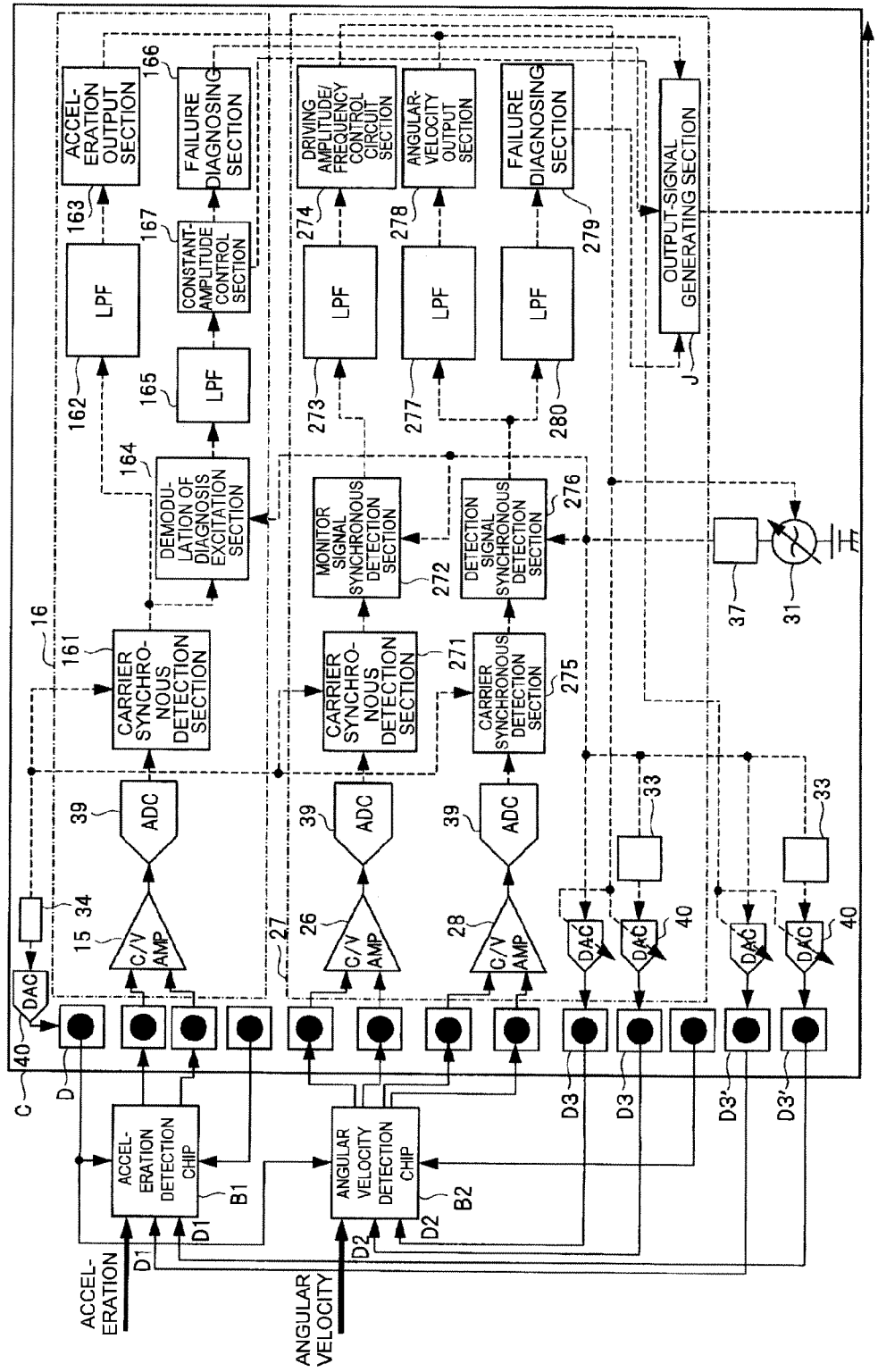
FIG. 7 is a diagram showing an example of the configuration of an acceleration-sensor control circuit section and an angular-velocity-sensor control circuit section, a digital clock source of which is a clock, in an inertial sensor in a second embodiment of the present invention.

FIG. 7 is a diagram showing an example of the configuration of the acceleration-sensor control circuit section 16 and the angular-velocity-sensor control circuit section 27, a digital clock source of which is a clock, in this embodiment. A difference from FIG. 6 is that signal processing is performed in a digital region. Analog voltage signals are converted into digital voltage signals through ADCs (Analog to Digital Converters) 39. The digital voltage signals are converted into the analog voltage signals through DACs (Digital to Analog Converters) 40. Ranges and bit widths of the ADCs 39 and the DACs 40 are set different from one another. In the figure, sections subjected to digital signal processing are indicated by broken lines.

Specifically, the ADCs 39 are respectively connected between the C/V conversion circuit 15 and the carrier synchronous detection section 161, between the C/V conversion circuit 26 and the carrier synchronous detection section 271, and between the C/V conversion circuit 28 and the carrier synchronous detection section 275. The DACs 40 are respectively connected between the carrier-signal generating section 34 and the pad D, between a digital clock source 37 and pads for driving voltage output D3 and D3', and between the phase inverters 33 and the pads for driving voltage output D3 and D3'. The DACs 40 connected to the pads for driving voltage output D3 are controlled by a driving signal from the driving amplitude/frequency control circuit section 274. The DACs 40 connected to the pads for driving voltage output D3' are controlled by a control signal from the constant-amplitude control section 167.

An output of the variable amplitude/variable frequency oscillator 31 is input to the digital clock source 37. The digital clock source 37 is a circuit including a comparator as an example and configured to generate a clock of a digital signal in which the output from the variable amplitude/variable frequency oscillator 31 is represented by a logic of H and L at every half period.

The clock generated by the digital clock source 37 is converted into an analog voltage diagnosis signal having an amplitude corresponding to an output of the constant-amplitude control section 167 by the DACs 40. A voltage for keeping vibration for a diagnosis of the acceleration sensor element section 1 at fixed displacement is output and connected to the pads for diagnosis voltage input D1 of the acceleration detection chip B1. When the pads for diagnosis voltage input D1 of the acceleration detection chip B1 are connected to the diagnosis electrodes 12 opposed to each other as shown in FIG. 2, diagnosis voltage in opposite phases each other are input to one electrode through the phase inverters 33.

In particular, as in the first embodiment, the driving frequency of the angular velocity sensor element section 2 is controlled to be the resonant frequency of the angular velocity sensor element section 2. Consequently, as explained above, it is possible to realize even a diagnosis of the acceleration sensor while efficiently obtaining the driving amplitude of the angular velocity sensor element section 2.

Making the best use of a characteristic that multiplication and vision are easily formed in the digital clock source 37, it is also possible to perform a diagnosis of the acceleration sensor element section 1 using a clock obtained by multiplying or dividing an original clock, i.e., the driving frequency and the resonant frequency of the angular velocity sensor element section 2. In this case, the resonant frequency of the angular velocity sensor element section 2 is designed and manufactured to match a frequency after the division or the multiplication of the digital clock source 37. That is, in a sensor module having multiple axes and multiple ranges for allowing the low-range acceleration sensor, the high-range acceleration sensor, and the angular velocity sensor to be housed in one package, a configuration for using the original clock for a diagnosis of the high-range acceleration sensor and using the clock obtained by dividing the original clock for a diagnosis of the low-range acceleration sensor can be realized by one oscillator.

As explained in the first embodiment, when the high-range acceleration sensor element section 1 is excited, the resonant frequency of the acceleration sensor element section 1 is designed and generated such that a response gain to the excitation exceeds 0 dB. Consequently, a large displacement can be obtained with a low diagnosis voltage. This is useful in practical use.

According to the embodiment explained above, as an effect different from the effects in the first embodiment, since the acceleration-sensor control circuit section 16 and the angular-velocity-sensor control circuit section 27 are configured by the digital circuits, a voltage signal input to the diagnosis electrodes 12 of the acceleration sensor element section 1 can be generated from a clock synchronizing with a voltage signal input to the driving electrodes 22 of the angular velocity sensor element section 2. The voltage signal input to the driving electrodes 22 of the angular velocity sensor element section 2 can be set to a voltage signal synchronizing with the natural frequency of the angular velocity sensor element section 2. The voltage signal input to the driving electrodes 22 of the angular velocity sensor element section 2 can be set to a signal having a frequency obtained by multiplying a clock synchronizing with the voltage signal input to the diagnosis electrodes 12 of the acceleration sensor element section 1 with an integer or dividing the clock by an integer. The natural frequency of the acceleration sensor element section 1 can be set to the frequency at which a gain is obtained more than 0 dB in a frequency component of the voltage signal input to the driving electrodes 22 of the angular velocity sensor element section 2.

Third Embodiment

Figure 8:
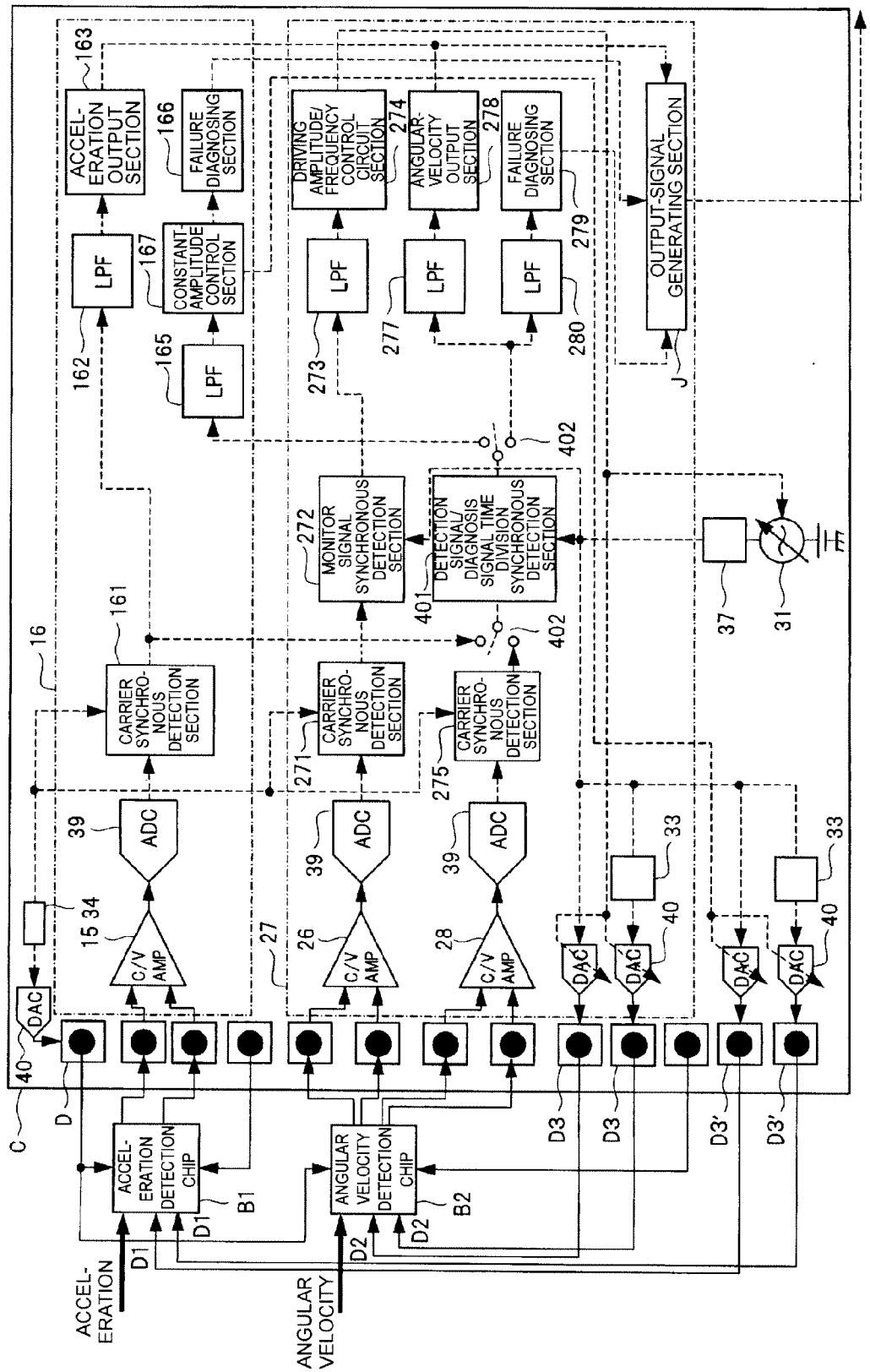
FIG. 8 is a diagram showing an example of the configuration of an acceleration-sensor control circuit section and an angular-velocity-sensor control circuit section that share a part of a circuit in a time division manner in an inertial sensor in a third embodiment of the present invention.

An inertial sensor in a third embodiment is explained with reference to FIG. 8. FIG. 8 is a diagram showing an example of the configuration of the acceleration-sensor control circuit section 16 and the angular-velocity-sensor control circuit section 27 that share a part of a circuit in a time division manner in this embodiment.

Since frequencies of detection signals used for synchronous detection of a detection signal of the angular velocity sensor element section 2 and synchronous detection of a diagnosis signal of the acceleration sensor element section 1 are the same, the angular velocity sensor element section 2 and the acceleration sensor element section 1 can be easily shared. Therefore, in this embodiment, concerning a detection signal synchronous detection section of an angular velocity sensor and a diagnosis signal synchronous detection section of an acceleration sensor, which are the two functions explained above, one detection signal diagnosis signal/ diagnosis signal time division synchronous detection section (a time division processing circuit) 401 is shared in a time division manner through a switch 402. In the following explanation, differences from the second embodiment are mainly explained.

In this embodiment, in a portion related to a synchronous detection section for a detection signal of the angular velocity sensor and a diagnosis signal of the acceleration sensor, the detection signal/diagnosis signal time division synchronous detection section 401 and the switch 402 are connected between the carrier synchronous detection sections 161 and 275 and the LPFs 165 and 280. The switch 402 consists of two systems. Common terminals of a first system and a second system are connected to the detection signal/ diagnosis signal time division synchronous detection section 401. One opening and closing terminal of the first system of the switch 402 is connected to an output of the carrier synchronous detection section 161. The other opening and closing terminal is connected to an output of the carrier synchronous detection section 275. One opening and closing terminal of the second system of the switch 402 is connected to an input of the LPF 165. The other opening and closing terminal is connected to an input of the LPF 280. A path from the carrier synchronous detection section 161 to the LPF 165 via the detection signal/diagnosis signal time division synchronous detection section 401 and a path from the carrier synchronous detection section 275 to the LPF 280 via the detection signal/diagnosis signal time division synchronous detection section 401 are switched by the switch 402.

In particular, when the sensor is turned on, it is appropriate to output an observed value after performing an initial diagnosis and confirming that there is no abnormality. Therefore, the detection signal/diagnosis signal time division synchronous detection section 401 is operated as a diagnosis signal synchronous detection circuit of the acceleration sensor immediately after the power-on and operated as a detection signal synchronous detection circuit of the angular velocity sensor after the initial diagnosis ends. Since frequencies of detection signals used for synchronous detections of monitor signals are also the same, even circuits used for the synchronous detections of the monitor signals can be combined into one circuit. Even if the frequencies of the detection signals used for the synchronous detections are the same, when phases are different, a circuit configured to adjust the phases according to an input signal and a state of a switch may be provided at the pre-stage of the detection signal/diagnosis signal time division synchronous detection section 401. A shared section is not limited to the synchronous detection section and may be configured as a part of an arbitrary circuit. For example, since an LPF and an ADC have substantially the same circuit configurations, it is easy to share the LPF and the ADC in a time division manner.

In FIG. 8, the circuit is shown as a circuit that performs signal processing using a digital value. However, the circuit may be configured by an analog circuit and configured to switch a signal using an analog switch.

According to the embodiment explained above, as an effect different from the effects in the first and second embodiment, since the sensor includes the detection signal/ diagnosis signal time division synchronous detection section 401 configured to process the diagnosis signal of the acceleration sensor and the detection signal of the angular velocity sensor in a time division manner, the detection signal/ diagnosis signal time division synchronous detection section 401 can be shared in a time division manner as a detection circuit of the acceleration sensor and a detection circuit of the angular velocity sensor.

Fourth Embodiment

Figure 9:
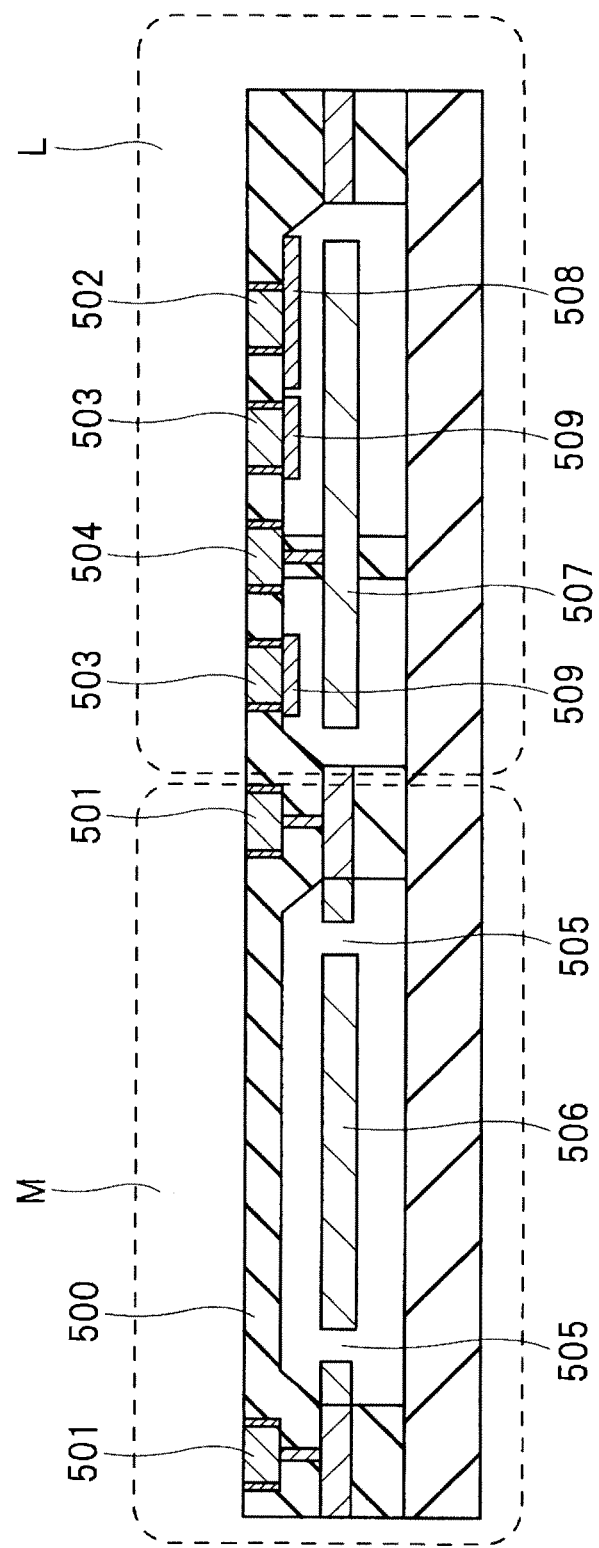
FIG. 9 is a diagram showing an example of cross sections of an acceleration sensor element section and an angular velocity sensor element section in an inertial sensor in a fourth embodiment of the present invention.

An inertial sensor in a fourth embodiment is explained with reference to FIGS. 9 and 10. FIG. 9 is a diagram showing an example of cross sections of an acceleration sensor element section L and an angular velocity sensor element section M in this embodiment. FIG. 10 is a diagram showing an example of the configuration of the acceleration sensor element section L and the angular velocity sensor element section M in FIG. 9 in plan view. FIG. 9 shows a cutting plane (the angular velocity sensor element section M) passing through 501, 505, 506, 505, and 501 in FIG. 10 and a cutting plane (the acceleration sensor element section L) passing through 509 (503), 507 (504), 509 (503), and 508 (502) in FIG. 10.

In this embodiment, the acceleration sensor element section L is an acceleration sensor element section having a seesaw structure configured to detect acceleration in a direction perpendicular to a chip (an out-of-plane direction). The angular velocity sensor element section M is a section for obtaining a function same as the function of the angular velocity sensor element section 2 in the first embodiment. In the following explanation, differences from the first to third embodiments are mainly explained.

In FIG. 9, reference numeral 500 denotes a chip section in which an acceleration sensor and an angular velocity sensor are housed in one chip, 501 denotes through electrode sections including driving electrodes for the angular velocity sensor, 502 denotes a through electrode section conducting to a diagnosis electrode for the acceleration sensor, 503 denotes through electrode sections conducting to a detection electrode for displacement detection of the acceleration sensor, 504 denotes a through electrode section including a common electrode conducting to a movable section of the acceleration sensor, 505 denotes driving electrodes for the angular velocity sensor, 506 denotes a movable section of the angular velocity sensor, 507 denotes a movable section of the acceleration sensor, 508 denotes a diagnosis electrode for giving displacement to the acceleration sensor from the outside and detecting a mechanical failure, and 509 denotes detection electrodes configured to detect displacement of the acceleration sensor.

In the acceleration sensor element section L explained in this embodiment, the detection electrodes 509 are provided only on one surface (in FIG. 9, an upper surface) with respect to the movable section 507. On the other hand, if detection electrodes are provided in both surface directions of the movable section 507, there are disadvantages that manufacturing costs for the detection electrodes, i.e., costs for a semiconductor micromachining process increase and the electrodes have to be drawn out from both the surfaces of the chip. Therefore, in this embodiment, the detection electrodes 509 are manufactured only on one surface.

In order to detect acceleration in the direction perpendicular to the chip and the polarity of the acceleration, the acceleration sensor in this embodiment includes the movable section 507 having mass asymmetrical with respect to an axis (a rotation axis; in FIG. 9, a position corresponding to the through electrode section 504 including the common electrode) and two detection electrodes 509 manufactured symmetrical with respect to the rotation axis. If the movable section 507 is a movable section having structure in which mass is asymmetrical with respect to the axis, even if acceleration is applied, a rotational motion does not occur. However, when mass is set asymmetrical as in this embodiment, the movable section 507 performs a rotational motion in response to the application of acceleration and the capacitance of one of the detection electrodes 509 increases and the capacitance of the other decreases. Therefore, it is possible to detect acceleration and polarity of the acceleration by calculating a difference between the capacities.

Because of the reason explained above, the movable section 507 has the mass asymmetrical with respect to the axis. The sizes of the detection electrodes 509 are desirably the same size in order to set initial capacities of the detection electrodes 509, the capacities of which are measured in a differential motion, equal to each other. In order to increase an SNR (Signal to Noise Ratio), the capacities of the detection electrodes 509 are desirably as large as possible. Therefore, in this embodiment, the diagnosis electrode 508 is manufactured only on a side (in FIG. 9, the right side) having large mass with respect to the axis and is not arranged on a side having small mass.

However, when the diagnosis electrode 508 is arranged only on one side with respect to the rotation axis in this way, since an electrostatic force is a force generated only in an attracting direction, a diagnosis can be performed in which the side having the large mass, i.e., the side where the diagnosis electrode 508 is manufactured is displaced in a direction for increasing the capacities of the detection electrodes 509. However, a diagnosis cannot be performed in which the side is displaced in the opposite direction, i.e., a direction for reducing the capacities of the detection electrodes 509. As explained in the first embodiment, when a range of detected acceleration is large, since the beams are hard, there is a limit in a diagnosis method for applying a direct-current voltage to the diagnosis electrode 508 and displace the diagnosis electrode 508.

Therefore, as shown in FIG. 10, this embodiment has a characteristic in a structure in which only one signal of driving signals of the angular velocity sensor output from pads for driving voltage output D5 of the control circuit chip C, which are connected to the driving electrodes 505 of the angular velocity sensor opposed to each other and applied with opposite phase driving voltages have a relation of an opposite phase relation, is input to the diagnosis electrode 508 of the acceleration sensor. A packaging method for the configuration is realized by the wiring method and the like explained in the first to third embodiments such as a method of connecting, in parallel, the bonding wires E shown in FIG. 10 to the though electrode sections 501 including the driving electrodes for the angular velocity sensor and the through electrode section 502 conducting to the diagnosis electrode 508 of the acceleration sensor.

When a driving voltage is applied to the through electrode section 502 conducting to the diagnosis electrode 508 of the acceleration sensor, if the frequency of the driving voltage is close to a resonant frequency at which a displacement gain with respect to a force applied to the movable section 507 of the acceleration sensor is larger than 0 dB, the movable section 507 performs resonant motion. The resonant motion includes not only motion at the frequency completely coinciding with a natural frequency of a system but also vibration at a frequency close to the natural frequency. The resonant motion makes it possible to obtain displacement in a direction at large amplitude, which cannot be obtained by direct current application, and displacement in a direction in which the capacitance of the detection electrode on the side having large mass with respect to the axis decreases, which cannot be obtained only by the diagnosis electrode on one side. The displacement in both the directions makes it possible to perform a more strict diagnosis of the movable section 507 of the acceleration sensor while adopting a low-cost structure in which the detection electrodes 509 are provided only on the surface on one side with respect to the movable section 507.

Specific explanation of a circuit is omitted above in order to avoid redundancy. In this embodiment, the various invention contents disclosed by this application explained in the first to third embodiments can also be applied.

According to the embodiment explained above, as an effect different from the effects in the first to third embodiments, since the movable section 507 of the acceleration sensor element section L has the mass asymmetrical with respect to the rotation axis for detecting acceleration and the diagnosis electrode 508 is provided only on one side with respect to the rotation axis of the movable section 507, it is possible to apply a voltage signal from the pads for driving voltage output D5 of the control circuit chip C to the diagnosis electrode 508 provided only on one side.

The present invention devised by the inventor is specifically explained above on the basis of the embodiments. However, the present invention is not limited to the embodiments. It goes without saying that various modifications are possible without departing from the spirit of the present invention. For example, the embodiments are embodiments in which the present invention is explained in detail in order to plainly explain the present invention. The embodiments are not always limited to embodiments including all the configurations explained above. A part of the configuration of a certain embodiment can be replaced with the configuration of another embodiment. The configuration of another embodiment can be added to the configuration of a certain embodiment. Other configurations can be added to, deleted from, and replaced with a part of the configurations of the embodiments.

What is claimed is:
1. An inertial sensor comprising:
an acceleration sensor;
an angular velocity sensor; and
a control circuit configured to control the acceleration sensor and the angular velocity sensor, wherein
the acceleration sensor includes:
 a first movable section held with first beams and configured to respond to acceleration applied thereto; and
 a first electrode configured to displace the first movable section with an electrostatic force according to voltage application from the control circuit, the angular velocity sensor includes:
 a second movable section, held with second beams independent from the first beams and mechanically isolated from the first movable section, configured to respond to an angular velocity applied thereto; and a second electrode configured to displace the second movable section with an electrostatic force according to voltage application from the control circuit, a voltage signal input to the first electrode of the acceleration sensor is generated from a clock synchronizing with a voltage signal input to the second electrode of the angular velocity sensor, the voltage signal input to the first electrode of the acceleration sensor is a signal for detecting a mechanical failure, a carrier signal for detecting displacement of the first movable section of the acceleration sensor has a frequency higher than a frequency of a signal applied to the first electrode, and the acceleration sensor is configured to obtain, at a resonant frequency of the angular velocity sensor, a gain more than 0 dB due to a resonant frequency of the acceleration sensor that is configured to detect acceleration.

2. The inertial sensor according to claim 1, wherein the voltage signal input to the second electrode of the angular velocity sensor is a voltage signal synchronizing with a resonant frequency of the angular velocity sensor.

3. The inertial sensor according to claim 1, wherein the resonant frequency of the acceleration sensor is a frequency at which a gain is obtained more than 0 dB in a frequency component of the voltage signal input to the second electrode of the angular velocity sensor.

4. The inertial sensor according to claim 1, wherein the control circuit includes an amplitude control circuit configured to adjust an amplitude of a voltage signal to control a vibration amplitude of the acceleration sensor to be fixed, and the voltage signal input to the first electrode of the acceleration sensor is a voltage signal passed through the amplitude control circuit.

5. The inertial sensor according to claim 1, wherein the voltage signal input to the second electrode of the angular velocity sensor is a signal having a frequency obtained by multiplying a clock synchronizing with the voltage signal input to the first electrode of the acceleration sensor with an integer or dividing the clock by an integer.

6. The inertial sensor according to claim 5, wherein a resonant frequency of the acceleration sensor is a frequency at which a gain is obtained more than 0 dB in a frequency component of the voltage signal input to the second electrode of the angular velocity sensor.

7. The inertial sensor according to claim 1, wherein the control circuit includes a time division processing circuit configured to process a diagnosis signal of the acceleration sensor and a detection signal of the angular velocity sensor in a time division manner, and the time division processing circuit is shared in a time division manner as a detection circuit of the acceleration sensor and a detection circuit of the angular velocity sensor.

8. The inertial sensor according to claim 1, wherein the first movable section of the acceleration sensor has mass asymmetrical with respect to a rotation axis for detecting acceleration, the first electrode of the acceleration sensor is provided only on one side with respect to the rotation axis of the first movable section having the asymmetrical mass, and a voltage signal from the control circuit is applied to the first electrode provided only on one side.

9. The inertial sensor according to claim 1, wherein the acceleration sensor, the angular velocity sensor, and the control circuit are respectively formed on different chips, and a first pad on a first chip connected to the first electrode of the acceleration sensor and a second pad on a second chip connected to the second electrode of the angular velocity sensor are respectively connected to a third pad for voltage application on a third chip of the control circuit by bonding wires.

10. The inertial sensor according to claim 9, wherein two pads are provided as each of the first pad, the second pad, and the third pad, and voltages of the respective pads have opposite phases each other.

11. The inertial sensor according to claim 1, wherein the acceleration sensor and the angular velocity sensor are formed on a same first chip, the control circuit is formed on a second chip different from the first chip, the first electrode of the acceleration sensor and the second electrode of the angular velocity sensor are connected to a common first pad on the first chip by wires, and the first pad on the first chip is connected to a second pad for voltage application on the second chip by a bonding wire.

12. The inertial sensor according to claim 11, wherein two pads are provided as each of the first pad and the second pad, and voltages of the respective pads have opposite phases each other.

* * * * *